US010837550B2

(12) United States Patent
Maebashi

(10) Patent No.: US 10,837,550 B2
(45) Date of Patent: Nov. 17, 2020

(54) STRADDLED VEHICLE

(71) Applicant: YAMAHA HATSUDOKI KABUSHIKI KAISHA, Iwata (JP)

(72) Inventor: Kosei Maebashi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 16/427,982

(22) Filed: May 31, 2019

(65) Prior Publication Data

US 2019/0285172 A1 Sep. 19, 2019

Related U.S. Application Data

(63) Continuation-in-part of application No. PCT/JP2017/042075, filed on Nov. 22, 2017.

(30) Foreign Application Priority Data

Dec. 1, 2016 (JP) .................................. 2016-233982

(51) Int. Cl.
*F16H 61/12* (2010.01)
*F16H 59/70* (2006.01)
(Continued)

(52) U.S. Cl.
CPC ............ *F16H 61/12* (2013.01); *F16H 59/70* (2013.01); *F16H 61/0204* (2013.01);
(Continued)

(58) Field of Classification Search
None
See application file for complete search history.

(56) References Cited

U.S. PATENT DOCUMENTS 6,205,390 B1 * 3/2001 Holbrook .............. F16H 59/105
477/128
7,584,681 B2 * 9/2009 Kozaki ................. F16H 59/105
74/335
(Continued)

FOREIGN PATENT DOCUMENTS

EP 3290752 A1 3/2018
JP H0854054 A 2/1996
(Continued)

*Primary Examiner* — Dirk Wright
(74) *Attorney, Agent, or Firm* — Rabin & Berdo, P.C.

(57) ABSTRACT

A straddled vehicle includes a gear position sensor abnormality detector which is configured to detect an abnormality of a gear position sensor which is provided at a crankshaft-supporter-integrated transmission supporter. The gear position sensor abnormality detector determines that the gear position sensor has an abnormality when the shift of a straddled vehicle from a stopped state to a running state is detected based on a signal from a rotation speed sensor while the gear position detected by the gear position sensor is included in a high-speed gear position class. Furthermore, the gear position sensor abnormality detector determines that the gear position sensor has an abnormality when the gear position detected by the gear position sensor is included in a low-speed gear position class and is different from a gear position estimated based on a signal from a crankshaft sensor and a signal from the rotation speed sensor.

10 Claims, 12 Drawing Sheets

(51) Int. Cl.
*F16H 61/02* (2006.01)
*F16H 59/40* (2006.01)
*F16H 59/42* (2006.01)
*F16H 59/44* (2006.01)
*F16H 59/38* (2006.01)
*F16H 59/68* (2006.01)

(52) U.S. Cl.
CPC .............. *F16H 59/38* (2013.01); *F16H 59/40* (2013.01); *F16H 59/42* (2013.01); *F16H 59/44* (2013.01); *F16H 59/68* (2013.01); *F16H 2059/706* (2013.01); *F16H 2061/1212* (2013.01); *F16H 2061/1272* (2013.01); *F16H 2061/1284* (2013.01)

(56) References Cited

U.S. PATENT DOCUMENTS

| | | | | |
|---|---|---|---|---|
| 8,112,204 B2* | 2/2012 | Yamada | ............ | F16H 61/12 |
| | | | | 701/51 |
| 8,412,425 B2* | 4/2013 | Katrak | ............ | F16H 61/12 |
| | | | | 701/63 |
| 8,914,185 B2* | 12/2014 | Ueno | ............ | F16H 61/12 |
| | | | | 701/29.2 |
| 9,115,806 B2* | 8/2015 | Nagashima | ............ | F16H 59/105 |
| 2005/0126322 A1* | 6/2005 | Kozaki | ............ | F16H 59/105 |
| | | | | 74/335 |

FOREIGN PATENT DOCUMENTS

| | | | |
|---|---|---|---|
| JP | H10281279 A | 10/1998 | |
| JP | H11101151 A | 4/1999 | |
| WO | 2016175238 A1 | 11/2016 | |

\* cited by examiner

FIG.1
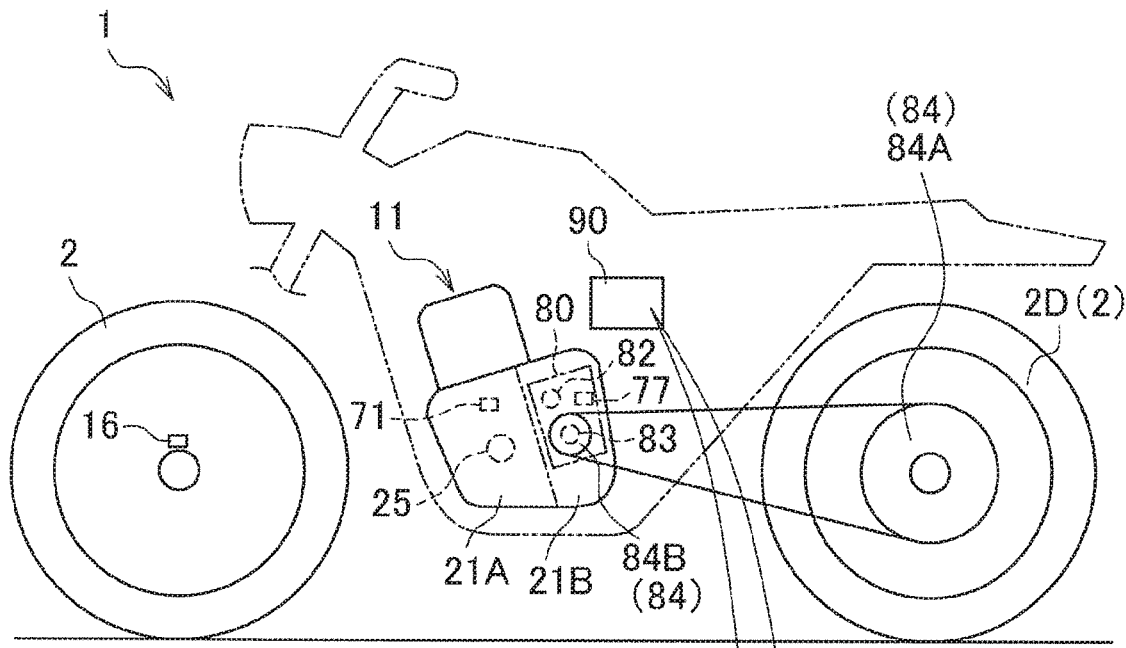
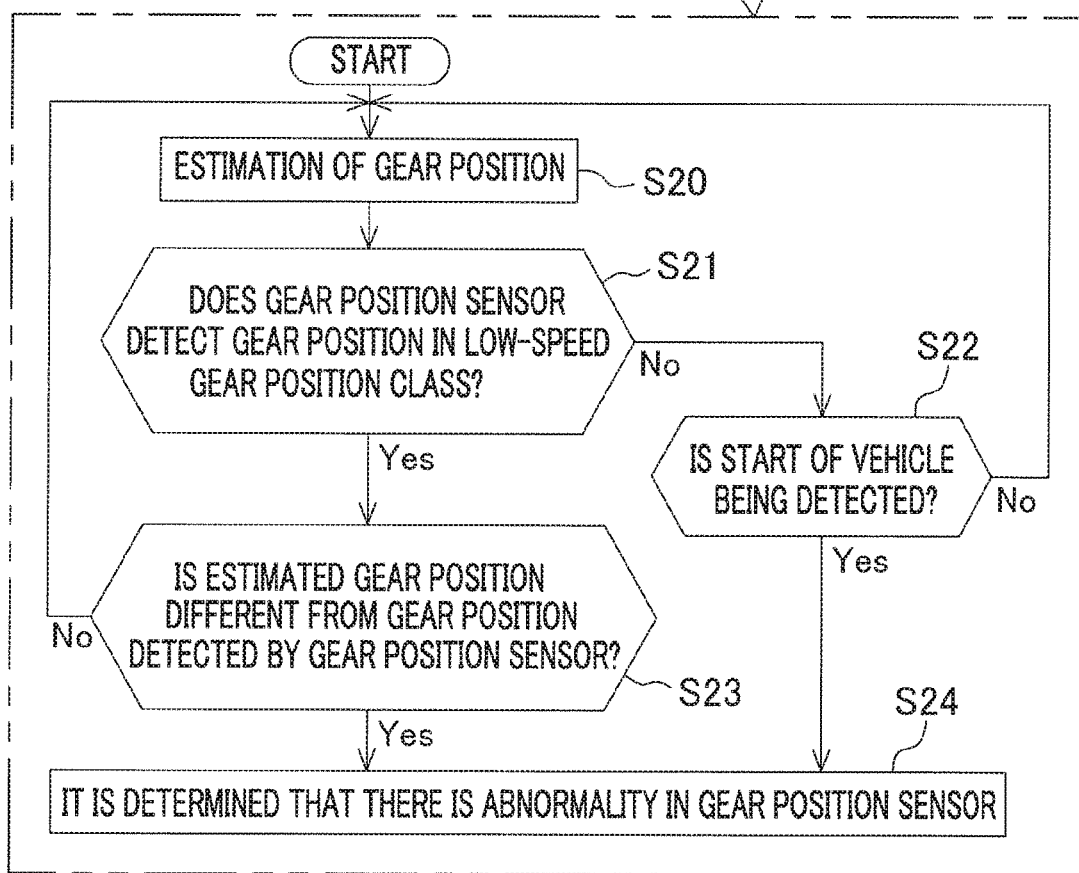

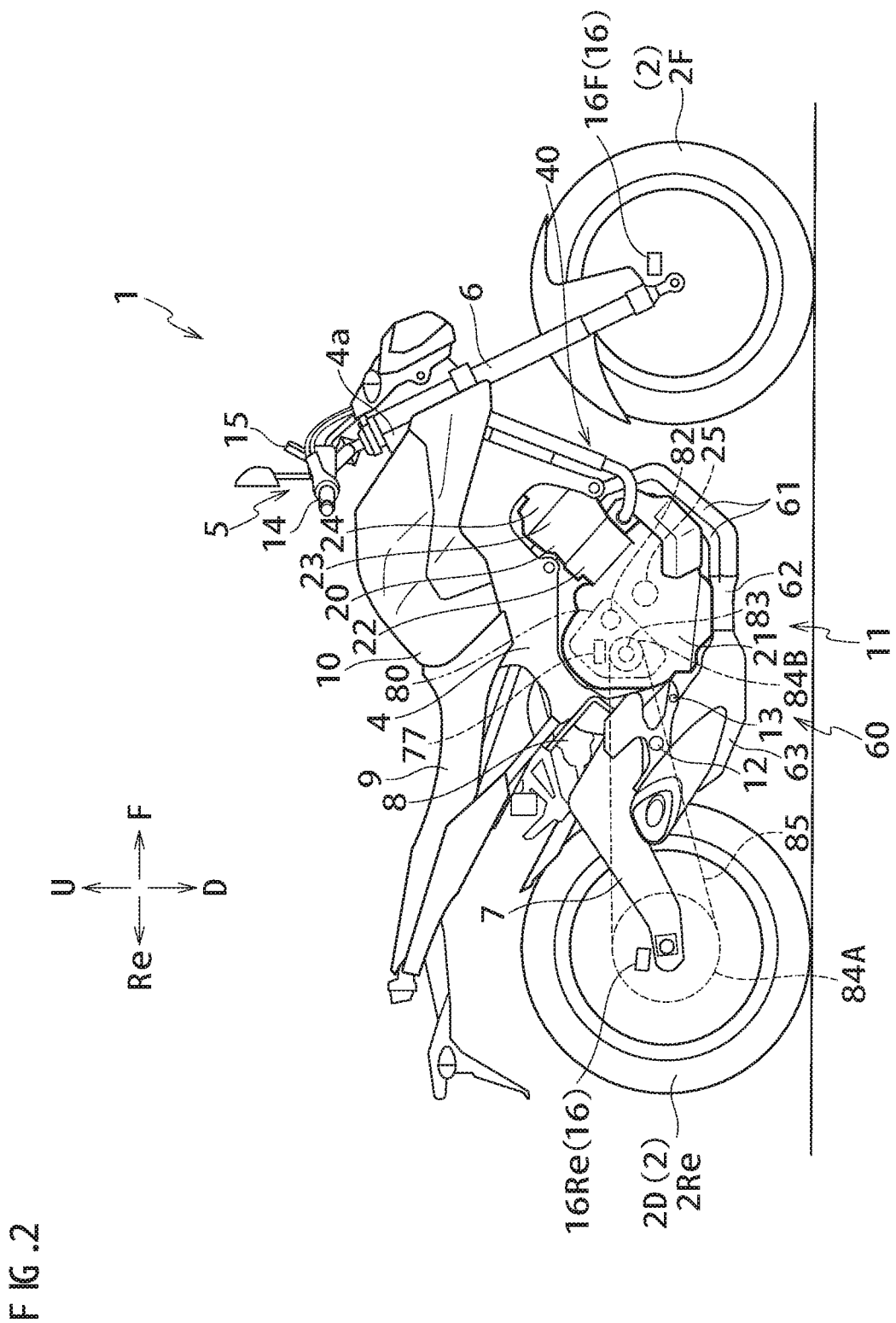
F I G. 2

STRADDLED VEHICLE

CROSS-REFERENCE TO RELATED APPLICATIONS

This application is a continuation-in-part of International Application No. PCT/JP2017/042075, filed on Nov. 22, 2017, and of Japanese Patent Application No. 2016-233982, filed on Dec. 12, 2016. The entire contents of each of the identified applications are incorporated herein by reference.

BACKGROUND

Technical Field

The present invention relates to a straddled vehicle including a gear position sensor abnormality detector which is configured to detect an abnormality in a gear position sensor.

Background Art

A straddled vehicle including a gear position sensor configured to detect a gear position of a transmission has been known. The straddled vehicle including the gear position sensor controls an engine based on a signal from the gear position sensor and an engine rotation speed. The gear position sensor is provided at a transmission supporter (casing) which supports the transmission. In the straddled vehicle, at least part of the transmission supporter may be integrally molded with at least part of a crankshaft supporter which supports a crankshaft.

A straddled vehicle including an abnormality detector configured to detect an abnormality of the gear position sensor is disclosed in Patent Literature 1 (identified further on), for example. In the abnormality detector of Patent Literature 1, when it is determined that the transmission is not in the neutral position, the gear position sensor is deemed to have an abnormality if a signal from the gear position sensor is out of a normal signal range. The abnormality detector of the gear position sensor of Patent Literature 1 can be employed in straddled vehicles of various riding styles. In other words, the abnormality detector of the gear position sensor of Patent Literature 1 has high versatility.

CITATION LIST

Patent Literatures

[Patent Literature 1] Japanese Unexamined Patent Publication No. H10-281279

According to the abnormality detector of Patent Literature 1, short-circuit or disconnection is detected by checking whether a signal from the gear position sensor falls within a normal range of voltage values. The present inventors have noticed that, in a straddled vehicle which employs the abnormality detector of Patent Literature 1, there is an undetectable abnormality of the gear position sensor.

SUMMARY

An object of the present teaching is to provide a straddled vehicle which includes a gear position sensor abnormality detector which can have improved capability of detecting an abnormality in a gear position sensor provided at a transmission supporter at least partially molded integrally with a crankshaft supporter, and can have reliable versatility.

When at least part of a transmission supporter supporting a transmission is integrally molded with at least part of a crankshaft supporter supporting a crankshaft, a gear position sensor provided at the transmission supporter is susceptible to vibration of the engine main body as compared to cases where the transmission supporter is separated from the crankshaft supporter. The vibration of the engine main body is, for example, vibration due to the movement of a piston. Furthermore, the running straddled vehicle bounces up and down on account of irregularities of the road surface. When an engine unit of a straddled vehicle is subjected to maintenance, a gear position sensor may be temporarily detached from the engine unit. In this case, a bolt fixing the gear position sensor to a transmission supporter may not be sufficiently fastened after the maintenance. The fastening tool may be loosened and detached on account of vibration of the vehicle due to irregularities of the road surface and vibration of the engine main body. If the fastening tool is detached, the gear position sensor is deviated. Consequently, a gear position detected based on a signal from the gear position sensor is different from the actual gear position.

The inventors of the subject application tried to detect an abnormality in such a gear position sensor by comparing a gear position detected by the gear position sensor with a gear position estimated based on the rotation speed of the crankshaft and the rotation speed of a wheel, etc.

The inventors of the subject application proceeded with the investigation by applying the gear position sensor abnormality detector to various straddled vehicles. As a result, it was found that detection of an abnormality in the gear position sensor was difficult in particular situations.

One situation is, for example, a case where a wheel driving sprocket is replaced with a wheel driving sprocket having a different diameter in a straddled vehicle in which a rotation speed sensor for detecting vehicle speed is provided at a wheel. The wheel driving sprocket is a collective term of a driven sprocket provided on the wheel and a drive sprocket driving the driven sprocket. The replacement to a wheel driving sprocket having a different diameter is carried out when, for example, the rider wishes to change the riding style.

When the diameter of the wheel driving sprockets is changed, the rotation speed of the wheel is changed even if the rotation speed of the crankshaft and the gear position remain the same. On this account, the gear position estimated from the rotation speed of the crankshaft and the rotation speed of the wheel is disadvantageously different from the gear position detected by the gear position sensor. It is difficult to set a range of rotation speed of the wheel relative to the rotation speed of the crankshaft for each gear position, in order to be able to estimate a correct gear position even after the diameter of the wheel driving sprocket is changed.

As a result of investigation, the inventors of the subject application found that, the higher the gear ratio of a gear position is, the smaller the degree of change of the rotation speed of the wheel is relative to a change in diameter of the wheel driving sprocket. To put it differently, the inventors found that, when the gear ratio of the gear position is high, the estimation of the gear position based on the rotation speed of the crankshaft and the rotation speed of the wheel is relatively accurate. It is noted that the gear ratio is the ratio of rotation speed of the input shaft of the transmission to the rotation speed of the output shaft of the transmission. On this account, when the engine rotation speed is the same, the rotation speed of the wheel increases as the gear ratio decreases.

In addition to the above, the inventors of the subject application found that, when there was an abnormality that the gear position sensor detected a gear position with a low gear ratio even if the actual gear position was a gear position with a high gear ratio, the abnormality in the gear position sensor was detectable by utilizing the state in which the vehicle starts to run. It is therefore possible to detect an abnormality in the gear position sensor without using a gear position estimated based on the rotation speed of the crankshaft and the rotation speed of the wheel.

The inventors of the subject application came across an idea to change the way abnormality in the gear position sensor is detected in accordance with the magnitude of the gear ratio of the gear position detected by the gear position sensor. When the gear ratio is low, an abnormality in the gear position sensor is detected by utilizing the state in which the vehicle starts to run. Meanwhile, when the gear ratio is high, an abnormality in the gear position sensor is detected by using the gear position estimated from the rotation speed of the crankshaft and the rotation speed of the wheel.

A gear position sensor abnormality detector configured to detect an abnormality in the gear position sensor by this way is able to highly accurately detect an abnormality in the gear position sensor even after the riding style of the straddled vehicle is changed. In other words, it is possible to improve the capability of detecting an abnormality of the gear position sensor while securing the versatility of the gear position sensor abnormality detector.

This gear position sensor abnormality detector is applicable to a straddled vehicle in which a rotation speed sensor for detecting vehicle speed is provided at a part different from the wheel. For example, the detector is applicable to a straddled vehicle in which a rotation speed sensor is provided at an output shaft of a transmission. The versatility of the gear position sensor abnormality detector is secured in this respect.

(1) A straddled vehicle of the present teaching includes: an engine unit including: (a) a crankshaft; and (b) a transmission which includes an input shaft to which power is transmitted from the crankshaft, and an output shaft to which the power is transmitted from the input shaft, the transmission having selectable gear positions, and a gear ratio which is a ratio of rotation speed of the input shaft to rotation speed of the output shaft being different between the gear positions; wheels which include at least one driving wheel to which the power is transmitted from the output shaft; a crankshaft sensor which is configured to detect rotation speed of the crankshaft; at least one rotation speed sensor which is configured to detect at least one of rotation speed of at least one of the wheels, the rotation speed of the output shaft, or rotation speed of an intermediate power transmission shaft which is configured to transmit the power of the output shaft to the at least one driving wheel; a gear position sensor which is configured to detect a gear position of the transmission; and a gear position sensor abnormality detector configured to detect an abnormality of the gear position sensor. the engine unit further includes, in addition to the crankshaft and the transmission: (c) a crankshaft supporter which supports the crankshaft; and (d) a crankshaft-supporter-integrated transmission supporter which supports the transmission, the gear position sensor being provided at the crankshaft-supporter-integrated transmission supporter, and at least part of the crankshaft-supporter-integrated transmission supporter being integrally molded with at least part of the crankshaft supporter. The gear positions are classified into a high-speed gear position class including a gear position having a lowest gear ratio among the gear positions and a low-speed gear position class consisting of at least one gear position having a higher gear ratio than gear ratios of gear positions in the high-speed gear position class. The gear position sensor abnormality detector includes at least one processor which is arranged or programmed: (A) to determine that there is an abnormality in the gear position sensor provided at the crankshaft-supporter-integrated transmission supporter, when detecting a shift of the straddled vehicle from a stopped state to a running state based on a signal from a first rotation speed sensor of the at least one rotation speed sensor, while a gear position detected by the gear position sensor provided at the crankshaft-supporter-integrated transmission supporter is included in the high-speed gear position class; (B) to estimate the gear position of the transmission based on a signal from the crankshaft sensor and a signal from a second rotation speed sensor of the at least one rotation speed sensor; and (C) to determine that there is an abnormality in the gear position sensor provided at the crankshaft-supporter-integrated transmission supporter, when a gear position detected by the gear position sensor provided at the crankshaft-supporter-integrated transmission supporter is included in the low-speed gear position class and is different from the estimated gear position.

According to this arrangement, the straddled vehicle includes the engine unit. The engine unit includes a crankshaft, a transmission, a crankshaft supporter, and a crankshaft-supporter-integrated transmission supporter. The crankshaft supporter supports the crankshaft. The crankshaft-supporter-integrated transmission supporter supports the transmission. The transmission includes an input shaft and an output shaft. The input shaft receives power from the crankshaft. The output shaft receives power from the input shaft. The transmission allows selection of one of a plurality of gear positions. The ratio of the rotational speed of the input shaft to the rotation speed of the output shaft is termed a gear ratio. The gear ratio is different at each gear position. The straddled vehicle includes wheels which include at least one driving wheel to which the power is transmitted from the output shaft of the transmission. The at least one driving wheel receives the power from the output shaft of the transmission. The straddled vehicle includes a gear position sensor which is configured to detect the gear position of the transmission. The gear position sensor is provided at the crankshaft-supporter-integrated transmission supporter which is at least partially molded integrally with at least part of the crankshaft supporter. The gear position sensor is therefore susceptible to vibration of the engine main body as compared to a gear position sensor which is provided at a transmission supporter separated from a crankshaft supporter. Furthermore, the running straddled vehicle bounces up and down on account of irregularities of the road surface. On this account, after the gear position sensor is temporarily detached for maintenance, a fastening portion of the gear position sensor which is susceptible to vibration tends to be loosened on account of the vibration. Consequently, a gear position detected based on a signal from the gear position sensor may be different from the actual gear position. To put it differently, the gear position sensor provided at the crankshaft-supporter-integrated transmission supporter is susceptible to vibration of the engine main body which tends to induce an abnormality in the gear position sensor, as compared to a gear position sensor which is provided at a transmission supporter separated from a crankshaft supporter.

The straddled vehicle includes a gear position sensor abnormality detector which is configured to detect an abnormality in the gear position sensor. The gear position sensor abnormality detector changes a way of detecting an abnormality in accordance with the gear position detected by the gear position sensor. The plural gear positions are classified into the high-speed gear position class and the low-speed gear position class. The high-speed gear position class includes the gear position having the lowest gear ratio among the gear positions. The low-speed gear position class is constituted by at least one gear position having a higher gear ratio than the gear ratios of the gear positions in the high-speed gear position class. The gear position sensor abnormality detector is arranged or programmed to determine that the gear position sensor has an abnormality when shift of the straddled vehicle from a stopped state to a running state is detected based on a signal of the first rotation speed sensor while the gear position sensor detects one of the gear positions in the high-speed gear position class. The shift of the straddled vehicle from the stopped state to the running state indicates that the straddled vehicle starts to run. The straddled vehicle includes at least one rotation speed sensor which is configured to detect at least one of the rotation speed of a wheel, the rotation speed of the output shaft, or the rotation speed of an intermediate power transmission shaft. The first rotation speed sensor is any of the at least one rotation speed sensor. The intermediate power transmission shaft is a shaft which is provided to transmit the power of the output shaft of the transmission to the at least one driving wheel. The gear position sensor abnormality detector is arranged or programmed to determine that the gear position sensor has an abnormality when the gear position of the transmission is estimated based on signals from a crankshaft sensor and the second rotation speed sensor and the gear position detected by the gear position sensor is included in the low-speed gear position class and is different from the estimated gear position. The second rotation speed sensor is any of the at least one rotation speed sensor. The second rotation speed sensor may or may not be identical with the first rotation speed sensor. The crankshaft sensor is a sensor configured to detect the rotation speed of the crankshaft.

A driven sprocket may be provided on the driving wheel of the straddled vehicle. The driven sprocket is driven by the drive sprocket. The diameter of the driven sprocket may be changed by replacement of the driven sprocket. The diameter of the drive sprocket may be changed by replacement of the drive sprocket. Hereinafter, the driven sprocket and the drive sprocket may be collectively termed wheel driving sprockets. The riding style is changed by changing the diameter of the wheel driving sprocket. When the diameter of the wheel driving sprockets is changed, the rotation speed of the wheel is changed even if the rotation speed of the crankshaft and the gear position remain the same. On this account, when the rotation speed sensor detects the rotation speed of the wheel, the gear position estimated based on a signal of the crankshaft sensor and a signal of the rotation speed sensor is different from the actual gear position in some cases.

However, when the gear ratio of the gear position is high, the degree of change of the rotation speed of the wheel is low relative to a change in diameter of the wheel driving sprocket. To put it differently, when the gear ratio of the gear position is high, the estimation of the gear position based on the rotation speed of the crankshaft and the rotation speed of the wheel is highly accurate. For this reason, when the gear position detected by the gear position sensor belongs to the low-speed gear position class and is different from the gear position estimated based on the rotation speed of the crankshaft and the rotation speed of the wheel, the gear position sensor is likely to have an abnormality. As described above, when the gear position detected by the gear position sensor belongs to the low-speed gear position class and is different from the gear position estimated based on signals of the crankshaft sensor and the rotation speed sensor, the gear position sensor abnormality detector determines that there is an abnormality in the gear position sensor. On this account, the gear position sensor abnormality detector is able to highly accurately detect an abnormality of the gear position sensor when the gear position detected by the gear position sensor belongs to the low-speed gear position class.

When the straddled vehicle starts to run, the gear position of the transmission is typically a gear position having a high gear ratio. Therefore, when the shift of the straddled vehicle from the stopped state to the running state is detected while the gear position sensor detects one of the gear positions in the high-speed gear position class, the gear position sensor is likely to have an abnormality. As described above, the gear position sensor abnormality detector determines that the gear position sensor has an abnormality when the shift of the straddled vehicle from the stopped state to the running state is detected based on a signal of the rotation speed sensor while the gear position sensor detects one of the gear positions in the high-speed gear position class. On this account, the gear position sensor abnormality detector is able to highly accurately detect an abnormality of the gear position sensor when the gear position detected by the gear position sensor belongs to the high-speed gear position class.

As described above, the gear position sensor abnormality detector of the present teaching is able to highly accurately detect an abnormality of the gear position sensor provided at the crankshaft-supporter-integrated transmission supporter, even after the diameter of the wheel driving sprocket is changed. The gear position sensor provided at the crankshaft-supporter-integrated transmission supporter is susceptible to vibration of the engine main body which tends to induce an abnormality in the gear position sensor, as compared to a gear position sensor which is provided at a transmission supporter which is separated from a crankshaft supporter. The gear position sensor abnormality detector of the present teaching, however, is able to highly accurately detect an abnormality of the gear position sensor. In addition to this, the gear position sensor abnormality detector has high versatility because the gear position sensor abnormality detector can detect an abnormality of the gear position sensor even after the diameter of the wheel driving sprocket is changed. To put it differently, the gear position sensor abnormality detector of the straddled vehicle of the present teaching can have both versatility and high capability of detecting an abnormality of the gear position sensor which is provided at the crankshaft-supporter-integrated transmission supporter and is susceptible to vibration of the engine main body.

The gear position sensor abnormality detector of the present teaching is able to use, for the estimation of the gear position, a signal of the rotation speed sensor which is configured to detect the rotation speed of either the output shaft of the transmission or the intermediate power transmission shaft. When the rotation speed of the crankshaft and the gear position of the transmission remain the same after a change in diameter of the wheel driving sprocket, the rotation speeds of the output shaft of the transmission and the intermediate power transmission shaft remain the same.

On this account, even after the diameter of the wheel driving sprocket is changed, the accuracy of the estimation of the gear position is not deteriorated, when the rotation speed sensor configured to detect the rotation speeds of the output shaft of the transmission and the intermediate power transmission shaft is used for the estimation of the gear position. Therefore, when the rotation speed sensor configured to detect the rotation speeds of the output shaft of the transmission or the intermediate power transmission shaft is used for the estimation of the gear position, an abnormality of the gear position sensor can be highly accurately detected by a comparison between the gear position detected by the gear position sensor and an estimated gear position, even if the gear position detected by the gear position sensor belongs to the high-speed gear position class. In this regard, by changing the way of abnormality detection in accordance with the gear position detected by the gear position sensor, it is possible to use the same program for abnormality determination as in the estimation of the gear position by using the wheel speed sensor. It is therefore possible to improve the versatility of the gear position sensor abnormality detector.

<2> According to another aspect of the present teaching, the straddled vehicle of the present teaching preferably has the following configuration.

The at least one processor of the gear position sensor abnormality detector is arranged or programmed not to determine that there is an abnormality in the gear position sensor provided at the crankshaft-supporter-integrated transmission supporter, when, after the shift of the straddled vehicle from the stopped state to the running state is detected based on the signal from the first rotation speed sensor while the gear position detected by the gear position sensor provided at the crankshaft-supporter-integrated transmission supporter is included in the high-speed gear position class, an unintended engine stall is detected while a gear position detected by the gear position sensor provided at the crankshaft-supporter-integrated transmission supporter is included in the high-speed gear position class.

For example, due to a mis-operation of the rider, the straddled vehicle may start to run while the gear position of the transmission is included in in the high-speed gear position class. This may cause an unintended engine stall. The gear position sensor abnormality detector does not determine that there is an abnormality in the gear position sensor when an unintended engine stall is detected after the shift of the straddled vehicle from the stopped state to the running state is detected, while a gear position detected by the gear position sensor is included in the high-speed gear position class. This can prevent erroneous detection of an abnormality in the gear position sensor when the gear position sensor operates normally but the straddled vehicle starts to run while the gear position of the transmission is included in the high-speed gear position class. The capability of detecting an abnormality of the gear position sensor by the gear position sensor abnormality detector can therefore be further improved.

<3> According to another aspect of the present teaching, the straddled vehicle of the present teaching preferably has the following configuration.

The at least one processor of the gear position sensor abnormality detector is arranged or programmed to determine that there is an abnormality in the gear position sensor provided at the crankshaft-supporter-integrated transmission supporter, when the number of times of detection of the shift of the straddled vehicle from the stopped state to the running state is counted based on the signal from the first rotation speed sensor and the counted number reaches a predetermined number which is more than one, while the gear position detected by the gear position sensor provided at the crankshaft-supporter-integrated transmission supporter is included in the high-speed gear position class.

The gear position sensor abnormality detector counts the number of times of detection of the shift of the straddled vehicle from the stopped state to the running state while a gear position detected by the gear position sensor is included in the high-speed gear position class. The gear position sensor abnormality detector determines that there is an abnormality in the gear position sensor when the count reaches a predetermined number which is two or more. On this account, the accuracy of the abnormality detection by the gear position sensor abnormality detector is improved as compared to a case where it is determined that there is an abnormality in the gear position sensor when the shift of the straddled vehicle from the stopped state to the running state is detected only once while a gear position detected by the gear position sensor is included in the high-speed gear position class. The capability of detecting an abnormality of the gear position sensor by the gear position sensor abnormality detector can be therefore further improved.

<4> According to another aspect of the present teaching, the straddled vehicle of the present teaching preferably has the following configuration, in addition to the arrangement (3).

The at least one processor of the gear position sensor abnormality detector is arranged or programmed to reset the counted number when, after the shift of the straddled vehicle from the stopped state to the running state is detected based on the signal from the first rotation speed sensor while the gear position detected by the gear position sensor provided at the crankshaft-supporter-integrated transmission supporter is included in the high-speed gear position class, an unintended engine stall is detected while a gear position detected by the gear position sensor provided at the crankshaft-supporter-integrated transmission supporter is included in the high-speed gear position class.

For example, due to a mis-operation of the rider, the straddled vehicle may start to run while the gear position of the transmission is included in the high-speed gear position class. This may cause an unintended engine stall. The gear position sensor abnormality detector resets the count when an unintended engine stall is detected while a gear position detected by the gear position sensor is included in the high-speed gear position class after the shift of the straddled vehicle from the stopped state to the running state is detected while the gear position detected by the gear position sensor is included in the high-speed gear position class. This can prevent erroneous detection of an abnormality in the gear position sensor when the gear position sensor operates normally but the straddled vehicle starts to run while the gear position of the transmission is included in the high-speed gear position class. An unintended engine stall does not always occur when the straddled vehicle starts to run while the gear position of the transmission straddled vehicle is included in the high-speed gear position class. The gear position sensor abnormality detector counts the number of times of detection of the shift of the straddled vehicle from the stopped state to the running state while the gear position detected by the gear position sensor is included in the high-speed gear position class. The gear position sensor abnormality detector determines that there is an abnormality in the gear position sensor when the count reaches a predetermined number which is two or more. For this reason, it is not determined that there is an abnormality in the gear position sensor when an unintended engine stall occurs in at least one of plural successive starts of the running of the straddled vehicle performed while the gear position of the transmission is included in the high-speed gear position class. This can restrain erroneous detection of an abnormality in the gear position sensor, and can improve the accuracy of the abnormality detection. The capability of detecting an abnormality of the gear position sensor by the gear position sensor abnormality detector can be therefore further improved.

<5> According to another aspect of the present teaching, the straddled vehicle of the present teaching preferably has the following configuration, in addition to the arrangement (3).

The at least one processor of the gear position sensor abnormality detector is arranged or programmed to reset the counted number when the shift of the straddled vehicle from the stopped state to the running state is detected based on the signal from the first rotation speed sensor while the gear position detected by the gear position sensor provided at the crankshaft-supporter-integrated transmission supporter is included in the low-speed gear position class.

The straddled vehicle may be successfully started to run even when the gear position of the transmission is included in the high-speed gear position class, depending on the state of the straddled vehicle, the ambient situation, or the range of the gear ratios in the high-speed gear position class. Therefore, even when the shift of the straddled vehicle from the stopped state to the running state is detected while the gear position detected by the gear position sensor is included in the high-speed gear position class, the gear position sensor may operate normally. However, it is actually rare that all of the plural successive starts of the running of the vehicle are performed while the gear position of the transmission is included in the high-speed gear position class. The gear position sensor abnormality detector resets the counted number when the shift of the straddled vehicle from the stopped state to the running state is detected based on a signal of the rotation speed sensor while the gear position detected by the gear position sensor is included in the low-speed gear position class. On this account, it is not determined that the gear position sensor has an abnormality if, during plural successive starts of the running of the straddled vehicle, the gear position detected by the gear position sensor is included in the high-speed gear position class in one start but the gear position detected by the gear position sensor is included in the low-speed gear position class in another start. This can restrain erroneous detection of an abnormality in the gear position sensor, and can improve the accuracy of the abnormality detection. The capability of detecting an abnormality of the gear position sensor by the gear position sensor abnormality detector can be therefore further improved.

<6> According to another aspect of the present teaching, the straddled vehicle of the present teaching preferably has the following configuration.

When the transmission is in none of the gear positions, the transmission is in a neutral position in which no power is transmitted from the input shaft to the output shaft. The gear position sensor is able to detect that the transmission is in the neutral position. The at least one processor of the gear position sensor abnormality detector is arranged or programmed to determine that there is an abnormality in the gear position sensor provided at the crankshaft-supporter-integrated transmission supporter, when the shift of the straddled vehicle from the stopped state to the running state is detected based on the signal from the first rotation speed sensor while the gear position sensor provided at the crankshaft-supporter-integrated transmission supporter detects the neutral position.

The straddled vehicle cannot start to run when the transmission is in the neutral position. On this account, when the shift of the straddled vehicle from the stopped state to the running state is detected based on a signal from the rotation speed sensor while the gear position sensor detects the neutral position, the gear position sensor is likely to have an abnormality. The sensor abnormality detector determines that the gear position sensor has an abnormality when the shift of the straddled vehicle from the stopped state to the running state is detected based on a signal of the rotation speed sensor while the gear position sensor detects the neutral position. The gear position sensor abnormality detector is able to detect an abnormality in the gear position sensor not only when the gear position sensor detects one of the gear positions but also when the gear position sensor detects the neutral position. The capability of detecting an abnormality of the gear position sensor by the gear position sensor abnormality detector can be therefore further improved.

<7> According to another aspect of the present teaching, the straddled vehicle of the present teaching preferably has the following configuration.

The at least one processor of the gear position sensor abnormality detector is arranged or programmed to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and there is one or more gear position between the gear position detected by the gear position sensor and the estimated gear position in terms of an order of gear ratios. The at least one processor of the gear position sensor abnormality detector is arranged or programmed not to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and either the gear position detected by the gear position sensor is identical with the estimated gear position or the detected gear position is adjacent to the estimated gear position in terms of the order of gear ratios.

As described above, when the gear ratio of the gear position of the transmission is high, the estimation of the gear position based on a signal of the crankshaft sensor and a signal of the rotation speed sensor is highly accurate. However, even when the gear ratio of the gear position of the transmission is high, the estimated gear position may be different from the actual gear position if the diameter of the wheel driving sprocket has been significantly changed. However, there is a limit to the change in diameter of the wheel driving sprocket. Therefore, even when the estimated gear position is different from the actual gear position, the estimated gear position is a gear position which is adjacent to the actual gear position in terms of the order of the gear ratios. It seems highly unlikely that the gear ratio of the estimated gear position is different from the gear ratio of the actual gear position by two or more stages in terms of the order of the gear ratios. The gear position sensor abnormality detector does not determine that there is an abnormality in the gear position sensor when the gear position detected by the gear position sensor is identical with the gear position estimated by the gear position estimation unit or the detected gear position is adjacent to the estimated gear position in terms of the order of the gear ratios. The gear position sensor abnormality detector determines that there is an abnormality in the gear position sensor when the gear position detected by the gear position sensor is included in the low-speed gear position class and there is one or more gear position between the gear position detected by the gear position sensor and the gear position estimated by the gear position estimation unit in terms of the order of the gear ratios. This can prevent erroneous detection of an abnormality in the gear position sensor when the gear position sensor operates normally but the riding style of the straddled vehicle is changed by changing the diameter of the wheel driving sprocket. It is therefore possible to highly accurately detect an abnormality in the gear position sensor while preventing erroneous detection of an abnormality in the gear position sensor after the riding style of the straddled vehicle is changed. To put it differently, the capability of detecting an abnormality of the gear position sensor by the gear position sensor abnormality detector is further improved while the versatility of abnormality detection in the gear position sensor can be further improved.

<8> According to another aspect of the present teaching, the straddled vehicle of the present teaching preferably has the following configuration. The low-speed gear position class includes at least two of the gear positions. The at least one processor of the gear position sensor abnormality detector is arranged or programmed to determine that there is an abnormality in the gear position sensor provided at the crankshaft-supporter-integrated transmission supporter when the gear position detected by the gear position sensor provided at the crankshaft-supporter-integrated transmission supporter is included in the low-speed gear position class and a gear ratio of the estimated gear position is lower than a highest gear ratio among the gear ratios of the gear positions in the high-speed gear position class. The at least one processor of the gear position sensor abnormality detector is arranged or programmed not to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and the gear ratio of the estimated gear position is identical with or higher than the highest gear ratio among the gear ratios of the gear positions in the high-speed gear position class.

As described above, when the gear ratio of the gear position of the transmission is high, the estimation of the gear position based on a signal of the crankshaft sensor and a signal of the rotation speed sensor is highly accurate. However, even when the gear ratio of the gear position of the transmission is high, the estimated gear position may be different from the actual gear position if the diameter of the wheel driving sprocket has been significantly changed. In this regard, even when the estimated gear position is different from the actual gear position, the estimated gear position is a gear position which is adjacent to the actual gear position in terms of the order of the gear ratios. It seems highly unlikely that the gear ratio of the estimated gear position is different from the gear ratio of the actual gear position by two or more stages in terms of the order of the gear ratios. The gear position sensor abnormality detector does not determine that there is an abnormality in the gear position sensor when the gear position estimated by the gear position sensor abnormality detector has the highest gear ratio in the high-speed gear position class or is a gear position having a gear ratio higher than the highest gear ratio in the high-speed gear position class. The gear position sensor abnormality detector determines that there is an abnormality in the gear position sensor when the gear position detected by the gear position sensor is included in the low-speed gear position class and the gear position estimated by the gear position estimation unit is a gear position with a lower gear ratio than the gear position with the highest gear ratio in the high-speed gear position class. It is therefore possible to highly accurately detect an abnormality in the gear position sensor while preventing erroneous detection of an abnormality in the gear position sensor even when the riding style of the straddled vehicle is changed by changing the diameter of the wheel driving sprocket. To put it differently, the capability of detecting an abnormality of the gear position sensor by the gear position sensor abnormality detector is further improved while the versatility of abnormality detection in the gear position sensor can be further improved.

<9> According to another aspect of the present teaching, the straddled vehicle of the present teaching preferably has the following configuration. The transmission includes a clutch which is switchable between a connection state in which power input from the crankshaft is transmitted to the input shaft and a cut-off state in which the power input from the crankshaft is not transmitted to the input shaft. A clutch sensor is further provided in the straddled vehicle to detect that the clutch is in the cut-off state or a half clutch state in which part of the power input from the crankshaft is transmitted to the input shaft. The at least one processor of the gear position sensor abnormality detector is arranged or programmed not to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and is different from the estimated gear position, but the clutch sensor detects either the cut-off state or the half clutch state of the clutch.

When the clutch is in the cut-off state or the half clutch state, at least part of the power input from the crankshaft is not transmitted to the input shaft of the transmission. On this account, when the clutch is in the cut-off state or the half clutch state, the gear position sensor abnormality detector cannot estimate the correct gear position. For this reason, when the clutch is in the cut-off state or the half clutch state, the gear position estimated by the gear position sensor abnormality detector may be different from the gear position detected by the gear position sensor. Even though the gear position detected by the gear position sensor is included in the low-speed gear position class and is different from the gear position estimated by the gear position sensor abnormality detector, the apparatus does not detect an abnormality in the gear position sensor when the gear position sensor abnormality detector detects the cut-off state or the half clutch state of the clutch. It is therefore possible to prevent erroneous detection of an abnormality in the gear position sensor when the gear position sensor operates normally and the clutch is either in the cut-off state or in the half clutch state. The capability of detecting an abnormality of the gear position sensor by the gear position sensor abnormality detector can be therefore further improved.

<10> According to another aspect of the present teaching, the straddled vehicle of the present teaching preferably has the following configuration. The at least one processor of the gear position sensor abnormality detector is arranged or programmed to determine that there is an abnormality in the gear position sensor provided at the crankshaft-supporter-integrated transmission supporter, when a duration of a state in which the gear position detected by the gear position sensor provided at the crankshaft-supporter-integrated transmission supporter is included in the low-speed gear position class and is different from the estimated gear position is measured and the measured duration is equal to or longer than a predetermined duration.

When the gear position of the transmission is changed while the straddled vehicle is running, the transmission of the power from the crankshaft to the input shaft of the transmission is temporarily cut off by the clutch. When the transmission of the power from the crankshaft to the transmission is cut off, the gear position sensor abnormality detector cannot estimate the correct gear position. The time during which the clutch cuts off the transmission of the power, however, is short. The gear position sensor abnormality detector measures a duration during which the gear position detected by the gear position sensor is included in the low-speed gear position class and is different from the gear position estimated by the gear position sensor abnormality detector. When the measured duration is equal to or longer than the predetermined duration, the gear position sensor abnormality detector determines that there is an abnormality in the gear position sensor. It is therefore possible to prevent erroneous detection of an abnormality in the gear position sensor even when the gear position detected by the gear position sensor is temporarily different from the gear position estimated by the gear position sensor abnormality detector on account of the cutoff of the power transmission from the crankshaft to the transmission by the clutch. The capability of detecting an abnormality of the gear position sensor by the gear position sensor abnormality detector can be therefore further improved.

Definitions of Terms

In the present teaching, a plurality of gear positions are classified into a high-speed gear position class and a low-speed gear position class. This indicates that every one of all gear positions of a transmission is included in either the high-speed gear position class or the low-speed gear position class.

In the present teaching, a stopped state of a motorcycle indicates a state in which vehicle speed is zero. In other words, the stopped state is a state in which rotation speed detected by a rotational angle sensor is zero. In the present teaching, a running state of a motorcycle indicates a state in which the motorcycle is running thanks to the power from an engine unit. The running state of the motorcycle does not encompass a case where the motorcycle is moved by manpower, etc. while the engine unit is not driven.

In the present teaching, an engine stall is a phenomenon whereby an engine unit is stopped. In the present teaching, an unintended engine stall indicates an engine stall which occurs even if the engine unit is not controlled to stop. In the present teaching, the unintended engine stall does not encompass an engine stall which occurs as the engine unit is controlled to stop. The unintended engine stall does not encompass so-called idling stop by which the engine unit is automatically stopped in idling. The unintended engine stall does not encompass the stop of the engine unit in response to a switch operation for stopping the engine unit.

In this specification, a phrase "a correct gear position cannot be estimated" does not indicate that an estimated gear position is always different from the actual gear position. In other words, an estimated gear position is not always a correct gear position.

In the present teaching, the number of times of detection of shift of a straddled vehicle from a stopped state to a running state is counted by one of the following two methods. According to the first method, the count is incremented one by one from zero. According to the second method, the count is decremented one by one from a predetermined value. In the first method, resetting the count means that the count is returned to zero. In the second method, resetting the count means that the count is returned to the predetermined value. In the present teaching, resetting the count means that the count is returned to an initial value.

The straddled vehicle of the present teaching indicates all types of vehicles on which a rider rides in a manner of straddling a saddle. The straddled vehicle of the present teaching includes motorcycles, tricycles, four-wheeled buggies (ATVs: All Terrain Vehicles), personal water crafts, snowmobiles, and the like. A motorcycle included in the straddled vehicle encompasses a scooter, an engine-equipped bicycle, a moped, or the like. The number of driving wheels may be one, or more than one.

In the present teaching, "processor" encompasses a CPU (Central Processing Unit), a micro controller, a microprocessor, an application specific integrated circuit (ASIC), a programmable logic circuit (PLC), a field programmable gate array (FPGA), and other types of circuits capable of executing processes described in the present teaching.

In the present specification, an end portion of a member indicates a portion constituted by an end and its surroundings of the member.

A passage member in the present specification indicates members such as wall members which encompass a passage to form the passage. The passage indicates a space where an object passes. An intake passage member indicates walls or the like which form an intake passage by surrounding the intake passage. The intake passage indicates a space through which air passes.

In this specification, an expression "an entity A is provided forward of an entity B" indicates the following state. The entity A is provided in front of a plane which passes the front-most end of the entity B and is orthogonal to the front-rear direction. In this case, the entities A and B may or may not be on an axial line parallel to the front-rear direction. This applies to expressions "an entity A is provided rearward of an entity B". Furthermore, the same applies to expressions "an entity A is provided above or below an entity B", and "an entity A is provided rightward of or leftward of an entity B".

In this specification, an expression "an entity A is provided in front of an entity B" indicates the following state. At least part of a rear surface of the entity A opposes at least part of a front surface of the entity B in the front-rear direction. Furthermore, the front-most end of the entity B is rearward of the front-most end of the entity A and the rear-most end of the entity B is forward of the rear-most end of the entity A. The rear surface of the entity A is a surface which is viewable when the entity A is viewed from the rear side. The rear surface of the entity A may be a single continuous surface or may be formed of plural non-continuous surfaces. The definition of the front surface of the entity B is similar to this.

The same applies to expressions "an entity A is provided behind an entity B", "an entity A is provided straight above or below an entity B", and "an entity A is provided to the right of or to the left of an entity B".

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs. Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicates "may but not must". In this specification, an arrangement which is explained by using the term "may" exerts at least the above-described effects of the arrangement (1) above.

In the present teaching, the arrangements of the above-described different aspects may be variously combined. Before an embodiment of the present teaching is detailed, the reader is informed that the present teaching is not limited to the configurations and layout of elements described below and/or shown in drawings. The present teaching may be implemented as an embodiment other than the below-described embodiments. The present teaching may be implemented as an embodiment other than the below-described embodiments. Furthermore, the present teaching may be implemented by suitably combining below-described modifications.

Advantageous Effects

With a gear position sensor abnormality detector of a straddled vehicle of the present teaching, capability of detecting an abnormality in a gear position sensor provided at a transmission supporter at least partially molded integrally with a crankshaft supporter can be improved and versatility can be secured.

BRIEF DESCRIPTION OF THE DRAWINGS

FIG. 1 includes a schematic view of a straddled vehicle of an embodiment of the present teaching and a flowchart of detecting an abnormality in a gear position sensor, which is executed by a gear position sensor abnormality detector of the straddled vehicle.

FIG. 2 is a side view of a motorcycle of a specific example of the embodiment of the present teaching.

DETAILED DESCRIPTION

<Embodiment of Present Teaching>

Figure 3:
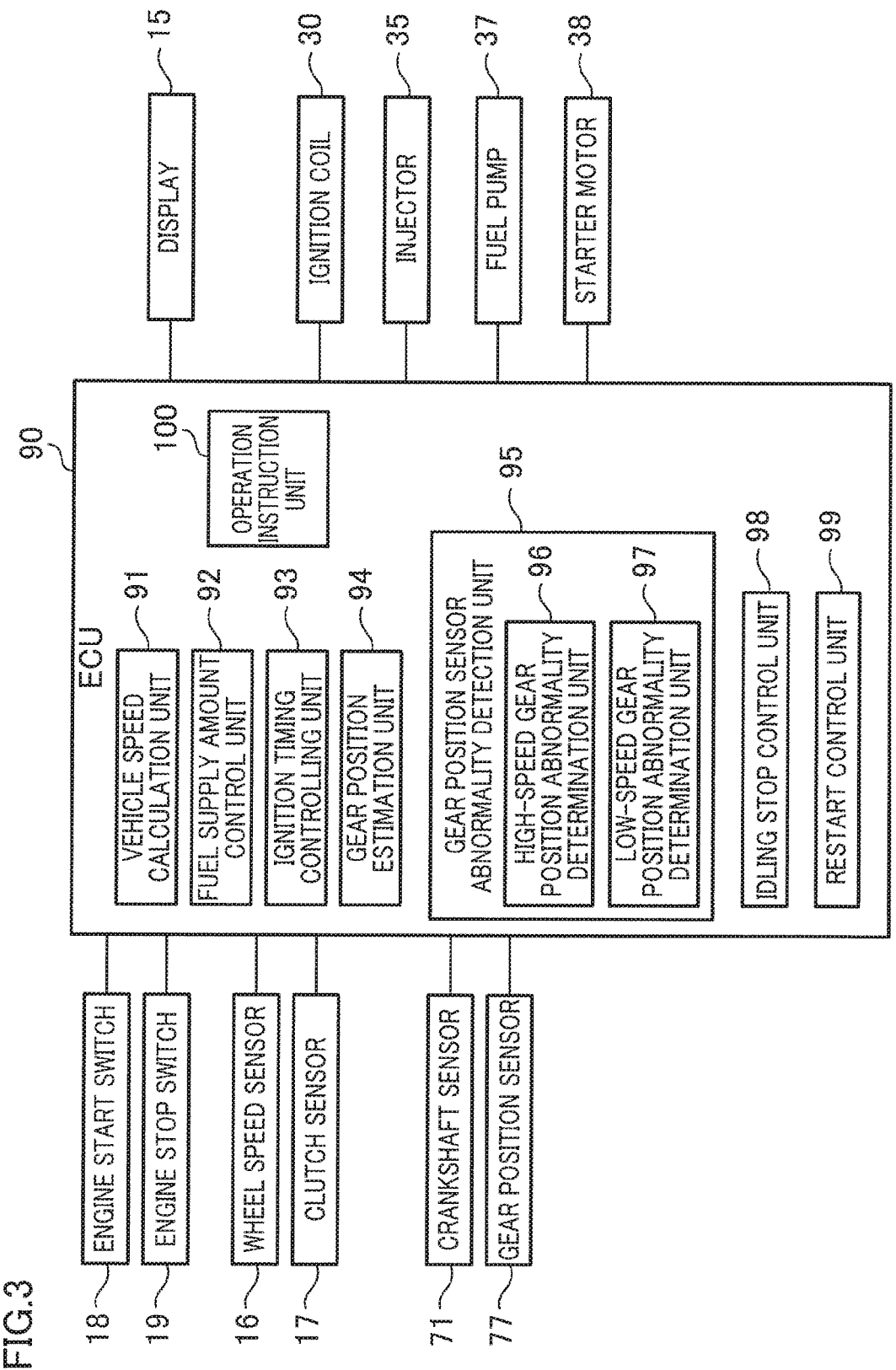
FIG. 3 is a control block diagram of the motorcycle of FIG. 2.

The following will describe a straddled vehicle 1 of an embodiment of the present teaching with reference to FIG. 1. The straddled vehicle 1 includes an engine unit 11. The engine unit 11 includes a crankshaft 25, a transmission 80, a crankshaft supporter 21A, and a crankshaft-supporter-integrated transmission supporter 21B. The crankshaft supporter 21A supports the crankshaft 25. The crankshaft-supporter-integrated transmission supporter 21B supports the transmission 80. The transmission 80 includes an input shaft 82 and an output shaft 83. The input shaft 82 receives power from the crankshaft 25. The output shaft 83 receives power from the input shaft 82. The transmission 80 allows selection of one of a plurality of gear positions. The ratio of the rotational speed of the input shaft 82 to the rotation speed of the output shaft 83 is termed a gear ratio. The gear ratio is different at each gear position. The straddled vehicle 1 includes wheels 2 including at least one driving wheel 2D. The at least one driving wheel 2D receives power from the output shaft 83 of the transmission 80. The driving wheel 2D is a rear wheel in FIG. 1. The driving wheel 2D may be a front wheel. The straddled vehicle 1 includes a gear position sensor 77 which is configured to detect the gear position of the transmission 80. The gear position sensor 77 is provided at the crankshaft-supporter-integrated transmission supporter 21B which is at least partially molded integrally with at least part of the crankshaft supporter. The gear position sensor 77 is therefore susceptible to vibration of the engine main body as compared to a gear position sensor which is provided at a transmission supporter separated from a crankshaft supporter. Furthermore, the running straddled vehicle 1 bounces up and down on account of irregularities of the road surface. On this account, after the gear position sensor 77 is temporarily detached for maintenance, a fastening portion of the gear position sensor 77 which is susceptible to vibration tends to be loosened on account of the vibration. Consequently, a gear position detected based on a signal from the gear position sensor 77 may be different from the actual gear position. To put it differently, the gear position sensor 77 provided at the crankshaft-supporter-integrated transmission supporter 21B is susceptible to vibration of the engine main body which tends to induce an abnormality in the gear position sensor 77, as compared to a gear position sensor which is provided at a transmission supporter separated from a crankshaft supporter.

The straddled vehicle 1 includes a gear position sensor abnormality detector 90 which is configured to detect an abnormality in the gear position sensor 77. The gear position sensor abnormality detector 90 changes a way of detecting an abnormality in accordance with the gear position detected by the gear position sensor 77. The gear positions are classified into a high-speed gear position class and a low-speed gear position class. The high-speed gear position class includes the gear position having the lowest gear ratio among the gear positions. The low-speed gear position class is constituted by at least one gear position having a higher gear ratio than gear ratios of the gear positions in the high-speed gear position class. The gear position sensor abnormality detector 90 includes at least one processor which is arranged or programmed to determine that the gear position sensor 77 has an abnormality when shift of the straddled vehicle 1 from a stopped state to a running state is detected based on a signal of a rotation speed sensor while the gear position sensor 77 detects one of the gear positions in the high-speed gear position class. The shift of the straddled vehicle 1 from the stopped state to the running state indicates that the straddled vehicle 1 starts to run. The straddled vehicle 1 includes at least one rotation speed sensor which is configured to detect at least one of the rotation speed of a wheel 2, the rotation speed of the output shaft 83, or the rotation speed of an intermediate power transmission shaft. The intermediate power transmission shaft (see an intermediate power transmission shaft 142 in FIG. 12) is a shaft which is provided to transmit the power of the output shaft 83 of the transmission 80 to the at least one driving wheel 2D. As an example of the rotation speed sensor, FIG. 1 displays a wheel speed sensor 16 configured to detect the rotational speed of the wheel 2. The at least one processor of the gear position sensor abnormality detector 90 is arranged or programmed to determine that the gear position sensor 77 has an abnormality when the gear position of the transmission 80 is estimated based on signals from a crankshaft sensor 71 and the rotation speed sensor and the gear position detected by the gear position sensor 77 is included in the low-speed gear position class and is different from the estimated gear position. The crankshaft sensor 71 is a sensor configured to detect the rotation speed of the crankshaft 25.

The flowchart in FIG. 1 shows an example of abnormality detection in the gear position sensor 77, which is executed by the gear position sensor abnormality detector 90. The steps of the abnormality detection in the gear position sensor by the gear position sensor abnormality detector in the present teaching may be different from the steps in the flowchart shown in FIG. 1. The gear position sensor abnormality detector 90 estimates the gear position of the transmission 80 based on a signal from the crankshaft sensor 71 and a signal from the rotation speed sensor (step S20). When the gear position detected by the gear position sensor 77 belongs to the high-speed gear position class (No in the step S21), the gear position sensor abnormality detector 90 determines whether shift of the straddled vehicle 1 from the stopped state to the running state is detected based on a signal from the rotation speed sensor while the gear position sensor 77 detects one of the gear positions in the high-speed gear position class (step S22). The shift of the straddled vehicle 1 from the stopped state to the running state indicates that the straddled vehicle 1 starts to run. When the start of the running of the straddled vehicle 1 is detected while the gear position sensor 77 detects one of the gear positions in the high-speed gear position class (Yes in the step S22), the gear position sensor abnormality detector 90 determines that the gear position sensor 77 has an abnormality (step S24). Meanwhile, when the gear position detected by the gear position sensor 77 belongs to the low-speed gear position class (Yes in the step S21), the gear position sensor abnormality detector 90 determines whether the gear position detected by the gear position sensor 77 is different from the estimated gear position (step S23). When the gear position detected by the gear position sensor 77 is different from the estimated gear position (Yes in the step S23), the gear position sensor abnormality detector 90 determines that the gear position sensor 77 has an abnormality (step S24).

A driven sprocket 84A is provided on the driving wheel 2D. The driven sprocket 84A is driven by a drive sprocket 84B provided on the output shaft 83. The diameter of the driven sprocket 84A may be changed by replacement of the driven sprocket 84A. Furthermore, the diameter of the drive sprocket 84B may be changed by replacement of the drive sprocket 84B. Hereinafter, the driven sprocket 84A and the drive sprocket 84B may be collectively termed wheel driving sprockets 84. The riding style is changed by changing the diameter of the wheel driving sprocket 84. When the diameter of a wheel driving sprocket 84 is changed, the rotation speed of the wheel 2 is changed even if the rotation speed of the crankshaft 25 and the gear position remain the same. The gear position estimated based on a signal of the crankshaft sensor 71 and a signal of the rotation speed sensor is therefore different from the actual gear position in some cases.

However, when the gear ratio of the gear position is high, the degree of change of the rotation speed of the wheel 2 is low relative to a change in diameter of the wheel driving sprocket 84. To put it differently, when the gear ratio of the gear position is high, the estimation of the gear position based on the rotation speed of the crankshaft 25 and the rotation speed of the wheel 2 is highly accurate. For this reason, when the gear position detected by the gear position sensor 77 belongs to the low-speed gear position class and is different from the gear position estimated based on the rotation speed of the crankshaft 25 and the rotation speed of the wheel 2, the gear position sensor 77 is likely to have an abnormality. As described above, when the gear position detected by the gear position sensor 77 belongs to the low-speed gear position class and is different from the gear position estimated based on signals of the crankshaft sensor 71 and the rotation speed sensor 16, the gear position sensor abnormality detector 90 determines that there is an abnormality in the gear position sensor 77. On this account, the gear position sensor abnormality detector 90 is able to highly accurately detect an abnormality of the gear position sensor 77 when the gear position detected by the gear position sensor 77 belongs to the low-speed gear position class.

When the straddled vehicle 1 shifts from the stopped state to the running state, the gear position of the transmission 80 is typically a gear position having a high gear ratio. Therefore, when the shift of the straddled vehicle 1 from the stopped state to the running state is detected while the gear position sensor 77 detects one of the gear positions in the high-speed gear position class, the gear position sensor 77 is likely to have an abnormality. As described above, the gear position sensor abnormality detector 90 determines that the gear position sensor 77 has an abnormality when the shift of the straddled vehicle 1 from the stopped state to the running state is detected based on a signal of the rotation speed sensor while the gear position sensor 77 detects one of the gear positions in the high-speed gear position class. On this account, the gear position sensor abnormality detector 90 is able to highly accurately detect an abnormality of the gear position sensor 77 when the gear position detected by the gear position sensor 77 belongs to the high-speed gear position class.

As described above, the gear position sensor abnormality detector 90 is able to highly accurately detect an abnormality of the gear position sensor 77 provided at the crankshaft-supporter-integrated transmission supporter 21B, even after the diameter of the wheel driving sprocket 84 is changed. The gear position sensor 77 provided at the crankshaft-supporter-integrated transmission supporter 21B is susceptible to vibration of the engine main body which tends to induce an abnormality in the gear position sensor 77, as compared to a gear position sensor which is provided at a transmission supporter which is separated from a crankshaft supporter. The gear position sensor abnormality detector 90, however, is able to highly accurately detect an abnormality of the gear position sensor 77. In addition to this, the gear position sensor abnormality detector 90 has high versatility because the gear position sensor abnormality detector 90 can detect an abnormality of the gear position sensor 77 even after the diameter of the wheel driving sprocket 84 is changed. To put it differently, the gear position sensor abnormality detector 90 of the straddled vehicle 1 can have both versatility and high capability of detecting an abnormality of the gear position sensor 77 which is provided at the crankshaft-supporter-integrated transmission supporter 21B and is susceptible to vibration of the engine main body.

The gear position sensor abnormality detector 90 is able to use, for the estimation of the gear position, a signal of the rotation speed sensor which is configured to detect the rotation speed of either the output shaft 83 of the transmission 80 or the intermediate power transmission shaft. When the rotation speed of the crankshaft 25 and the gear position of the transmission 80 remain the same after a change in diameter of the wheel driving sprocket 84, the rotation speeds of the output shaft 83 of the transmission 80 and the intermediate power transmission shaft remain the same. On this account, even after the diameter of the wheel driving sprocket 84 is changed, the accuracy of the estimation of the gear position is not deteriorated, when the rotation speed sensor configured to detect the rotation speeds of the output shaft 83 of the transmission 80 and the intermediate power transmission shaft is used for the estimation of the gear position. Therefore, when the rotation speed sensor configured to detect the rotation speeds of the output shaft 83 of the transmission 80 or the intermediate power transmission shaft is used for the estimation of the gear position, an abnormality of the gear position sensor 77 can be highly accurately detected by a comparison between the gear position detected by the gear position sensor 77 and an estimated gear position, even if the gear position detected by the gear position sensor 77 belongs to the high-speed gear position class. In this regard, by changing the way of abnormality detection in accordance with the gear position detected by the gear position sensor 77, it is possible to use the same program for abnormality determination as in the estimation of the gear position by using the wheel speed sensor 16. It is therefore possible to improve the versatility of the gear position sensor abnormality detector 90.

Specific Example of Embodiment of Present Teaching

A specific example of the above-described embodiment of the present teaching will be described with reference to FIGS. 2 to 11. This specific example of the embodiment of the present teaching is an example in which the straddled vehicle 1 of the embodiment of the present teaching is used for a motorcycle. Basically, the specific example of the embodiment of the present teaching encompasses all features of the embodiment of the present teaching described above. Members identical with those in the above-described embodiment of the present teaching are not explained again. The following will describe arrangements which are different from those of the above-described embodiment of the present teaching.

In the descriptions below, an up-down direction is an up-down direction of a motorcycle 1 which vertically stands up on a horizontal road surface. A left-right direction and a front-rear direction are directions viewed by a rider seated on a motorcycle 1 which vertically stands up on a horizontal road surface. In each figure, arrows F, Re, U, D indicate forward, rearward, upward, and downward, respectively.

(1) Overall Structure of Motorcycle

As shown in FIG. 2, the motorcycle 1 includes one front wheel 2F, one rear wheel 2Re, and a vehicle body frame 4. The vehicle body frame 4 includes a head pipe 4a at a front portion. A steering shaft (not illustrated) is rotatably inserted into the head pipe 4a. The upper end portion of the steering shaft is connected to a handle unit 5. An upper end portion of a pair of front forks 6 is fixed to the handle unit 5. The lower end portions of the pair of front forks 6 support the front wheel 2F. The front wheel 2F includes a tire and a wheel.

The vehicle body frame 4 swingably supports a pair of swingarms 7. The rear end portions of the paired swing arms 7 support the rear wheel 2Re. The rear wheel 2Re includes a tire and a wheel. Each swingarm 7 is connected, at a portion rearward of the swing center, to the vehicle body frame 4 via a rear suspension 8.

The vehicle body frame 4 supports a seat 9 and a fuel tank 10. The fuel tank 10 is provided in front of the seat 9. The vehicle body frame 4 supports the engine unit 11. The engine unit 11 is provided below the upper end of the seat 9. The seat 9 is a part on which a rider (driver) sits, and does not include a part on which a rider's waist or back leans. The seat 9 does not include a part on which a tandem rider (passenger) sits. The vehicle body frame 4 supports a battery (not illustrated). The battery supplies electric power to electronic devices such as an ECU 90 and sensors which will be described later. The ECU 90 is an example of the gear position sensor abnormality detector 90 of the embodiment of the present teaching.

The motorcycle 1 includes footrests 12 at lower left and right portions. A brake pedal 13 is provided in front of the right footrest 12. As the rider operates the brake pedal 13, the rotation of the rear wheel 2Re is braked. A shift pedal which is not illustrated is provided in front of the left footrest 12. This shift pedal is operated when the gear position of a later-described transmission 80 (see FIG. 5) is changed. Alternatively, a shift switch may be provided on the handle unit 5 in place of the shift pedal.

The handle unit 5 includes an accelerator grip 14, a brake lever (not illustrated), and a clutch lever (not illustrated). The accelerator grip is operated for adjusting the output of the engine. The brake lever is operated for braking the rotation of the front wheel 2F. The clutch lever operates a clutch 81 (see FIG. 5) of a later-described transmission 80. The clutch lever is operated when the power transmission from the crankshaft 25 to the rear wheel 2Re via the clutch 81 is cut off. A clutch sensor 17 (see FIG. 3) is provided on the handle unit 5 to detect the degree of movement of the clutch lever. The clutch sensor 17 is also known as a clutch switch. When the clutch lever is gripped, the clutch sensor 17 outputs an electrical signal. When the clutch lever is released, the clutch sensor 17 does not output any electrical signal.

Various types of switches operated by the rider are provided on the handle unit 5. Although not illustrated, these switches include a main switch, an engine start switch 18 (see FIG. 3), and an engine stop switch 19 (see FIG. 3). The main switch may be a key switch operated by a key, for example. When the main switch is turned on, electric power stored in the battery is supplied to electronic devices such as the ECU 90 and sensors. When the main switch is turned off, the power supply from the battery to the ECU 90 is stopped. The engine start switch 18 is operated to start the engine unit 11. The engine stop switch 19 is operated to stop the engine unit 11.

As shown in FIG. 2 and FIG. 3, the motorcycle 1 includes a display 15. The display 15 is attached to the handle unit 5. The display 15 is positioned to be viewable by the rider seated on the seat 9. The display 15 may not be attached to the handle unit 5. The display 15 is configured to display vehicle speed, engine rotation speed, gear position, warnings, and the like.

As shown in FIG. 2, the motorcycle 1 includes a front wheel speed sensor 16F which is configured to detect the rotation speed of the front wheel 2F. The motorcycle 1 further includes a rear wheel speed sensor 16Re configured to detect the rotation speed of the rear wheel 2Re. Hereinafter, the front wheel speed sensor 16F and the rear wheel speed sensor 16Re may be collectively termed as a wheel speed sensor 16 (see FIG. 3). The wheel speed sensor 16 is equivalent to the rotation speed sensor of the present teaching. In addition, the front wheel 2F and the rear wheel 2Re may be collectively termed as wheel 2. The wheel speed sensor 16 may be provided at only one of the front wheel 2F or the rear wheel 2Re. The wheel speed sensor 16 is configured to output a pulse signal at a frequency in proportion to the rotation speed of the wheel 2. A detection method of the wheel speed sensor 16 is not limited to a particular one. For example, a permanent magnet may be embedded in a hub bearing of the wheel 2. The wheel speed sensor 16 may detect the rotation speed by detecting a change in magnetic flux on account of the rotation of the permanent magnet. Alternatively, for example, holes or irregularities may be provided in a ring which rotates together with the wheel 2, at regular intervals in the circumferential direction. The wheel speed sensor 16 may detect the rotation speed by detecting a change in magnetic flux on account of the rotation of the holes or the irregularities.

(2) Structure of Engine Unit 11

Figure 4:
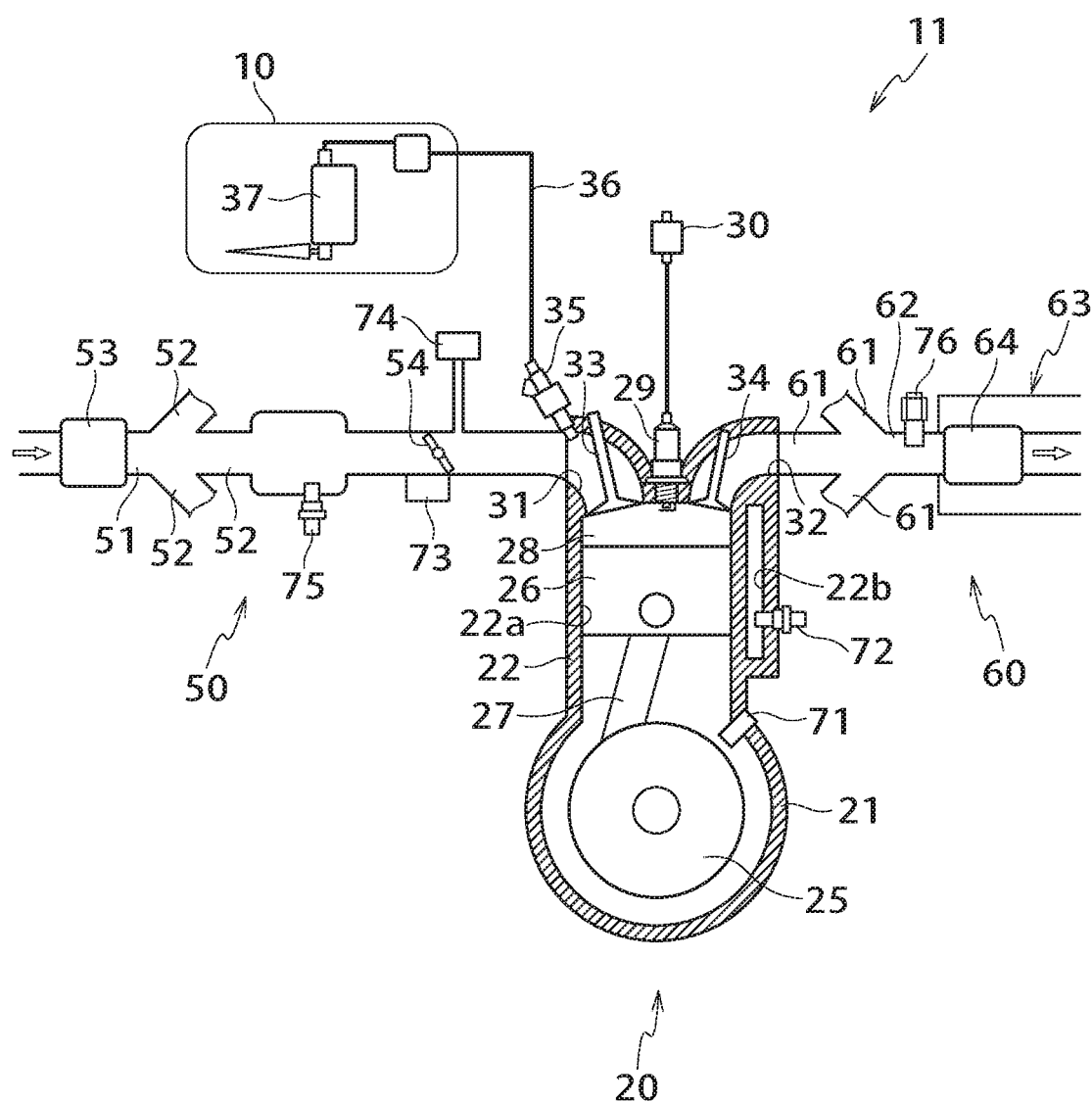
FIG. 4 is a schematic diagram of an engine unit of the motorcycle of FIG. 2.

As shown in FIG. 2 and FIG. 4, the engine unit 11 includes an engine main body 20, an intake unit 50 (see FIG. 4), and an exhaust unit 60. The engine unit 11 is a three-cylinder engine including three cylinders. The engine unit 11 is a four-stroke single-cycle engine. The four-stroke single-cycle engine repeats, in each cylinder, an intake process, a compression process, a combustion process (expansion process), and an exhaust process. The combustion process in the three-cylinder engine is performed at different timings in the respective three cylinders. In FIG. 4, only one of the three cylinders of the engine main body 20 is illustrated, and the remaining two cylinders are omitted.

The engine unit 11 is a water-cooled engine. As shown in FIG. 2, the engine unit 11 includes a water cooling unit 40. Hot coolant water, which has absorbed the heat of the engine main body 20, is sent to the water cooling unit 40. The water cooling unit 40 cools the coolant water sent from the engine main body 20 and returns the water to the engine main body 20.

Figure 6:
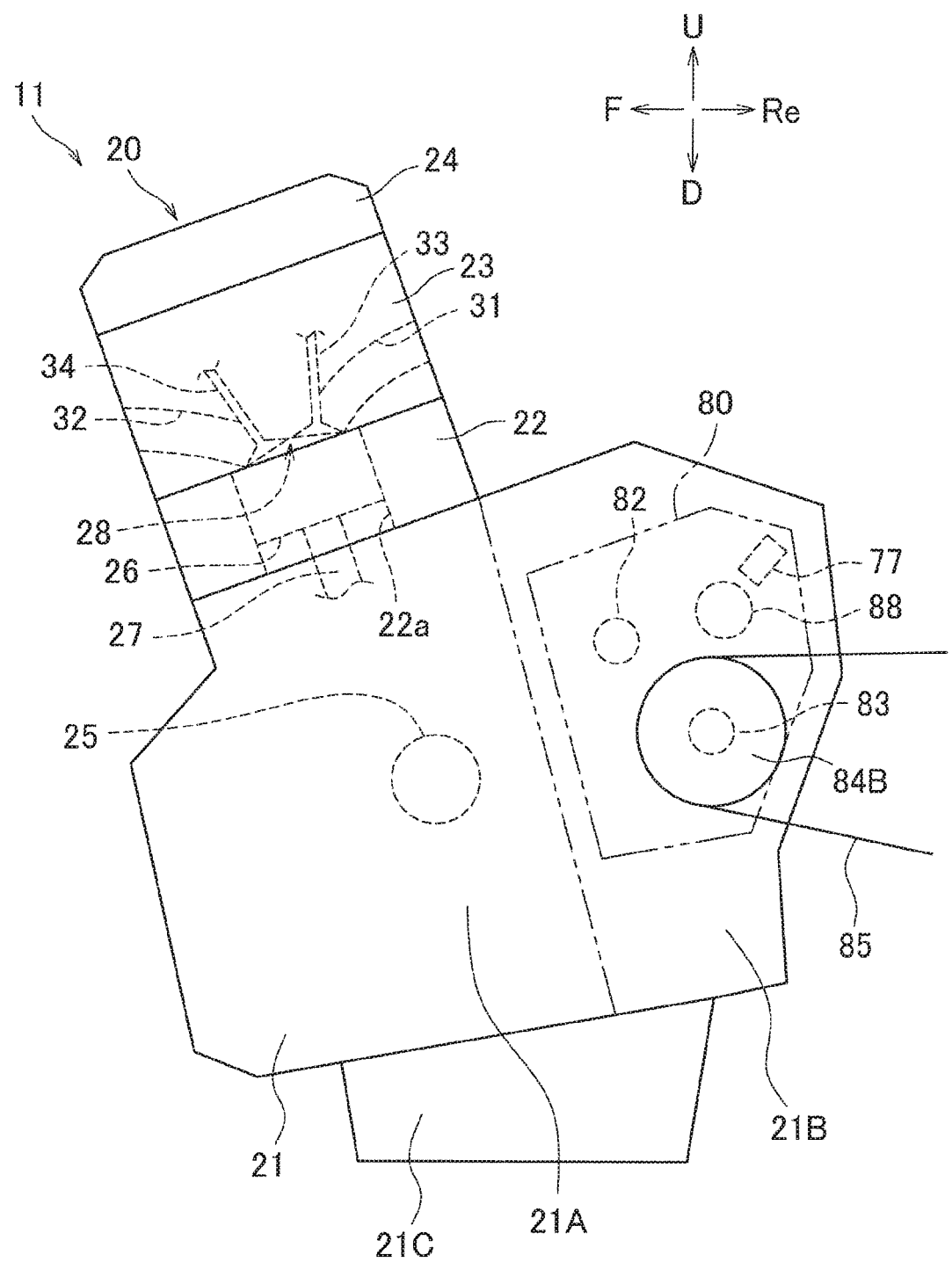
FIG. 6 is a schematic side view of the engine unit of the motorcycle of FIG. 2.

As shown in FIG. 2 and FIG. 6, the engine main body 20 includes a crankcase 21, a cylinder body 22, a cylinder head 23, and a head cover 24. The cylinder body 22 is attached to an upper end portion of the crankcase 21. The cylinder head 23 is attached to an upper end portion of the cylinder body 22. The head cover 24 is attached to an upper end portion of the cylinder head 23.

As shown in FIG. 2 and FIG. 6, the crankcase 21 houses the crankshaft 25 and the transmission 80. The crankshaft 25 and the transmission 80 are included in the engine main body 20. The crankcase 21 includes the crankshaft supporter 21A and the crankshaft-supporter-integrated transmission supporter 21B. The crankshaft supporter 21A rotatably supports the crankshaft 25. The crankshaft supporter 21A supports the crankshaft 25 via at least one bearing. The crankshaft-supporter-integrated transmission supporter 21B supports the input shaft 82 and the output shaft 83 of the transmission 80. The crankshaft supporter crankshaft-supporter-integrated transmission supporter 21B supports the input shaft 82 via at least one bearing. The crankshaft supporter crankshaft-supporter-integrated transmission supporter 21B supports the output shaft 83 via at least one bearing. The crankcase 21 is formed by combining a plurality of components. The components of the crankcase 21 are formed by using a die, e.g., by casting. As shown in FIG. 6, the crankcase 21 includes an oil pan 21C which is provided at a lower portion. The oil pan 21C stores lubrication oil. The oil pan 21C of the present embodiment is an independent member. The oil pan 21C may not be an independent member. The oil pan 21C includes neither the crankshaft supporter 21A nor the crankshaft-supporter-integrated transmission supporter 21B. The oil pan 21C may not be an independent member. At least part of the crankshaft supporter 21A is molded integrally with at least part of the crankshaft-supporter-integrated transmission supporter 21B. A two-dot chain line in FIG. 6 indicates the border between the crankshaft supporter 21A and the crankshaft-supporter-integrated transmission supporter 21B. The border may be differently positioned. The border between the crankshaft supporter 21A and the crankshaft-supporter-integrated transmission supporter 21B may partially include a border formed by connecting independent members with each other, or may not include such a border at all. The crankcase 21 may be constituted by a left case functioning as left part of the crankcase 21 and a right case provided to the right of the left case.

As shown in FIG. 3 and FIG. 4, the motorcycle 1 includes the crankshaft sensor 71. The crankshaft sensor 71 is provided in the engine unit 11. The crankshaft sensor 71 is configured to detect the rotation speed of the crankshaft 25, i.e., the engine rotation speed. To be more specific, the crankshaft sensor 71 detects the rotation number of the crankshaft 25 per unit time.

The transmission 80 is configured to transmit power input from the crankshaft 25 to the rear wheel 2Re. The rear wheel 2Re is therefore the driving wheel 2D. The transmission 80 is a constant-mesh transmission. The transmission 80 is a manual transmission. The transmission 80 is a sequential shift transmission. In the sequential shift transmission, the gear position is changeable only sequentially. In other words, in the sequential shift transmission, the gear position is changeable only to a neighboring gear position in terms of the order of the gear ratios.

Figure 5:
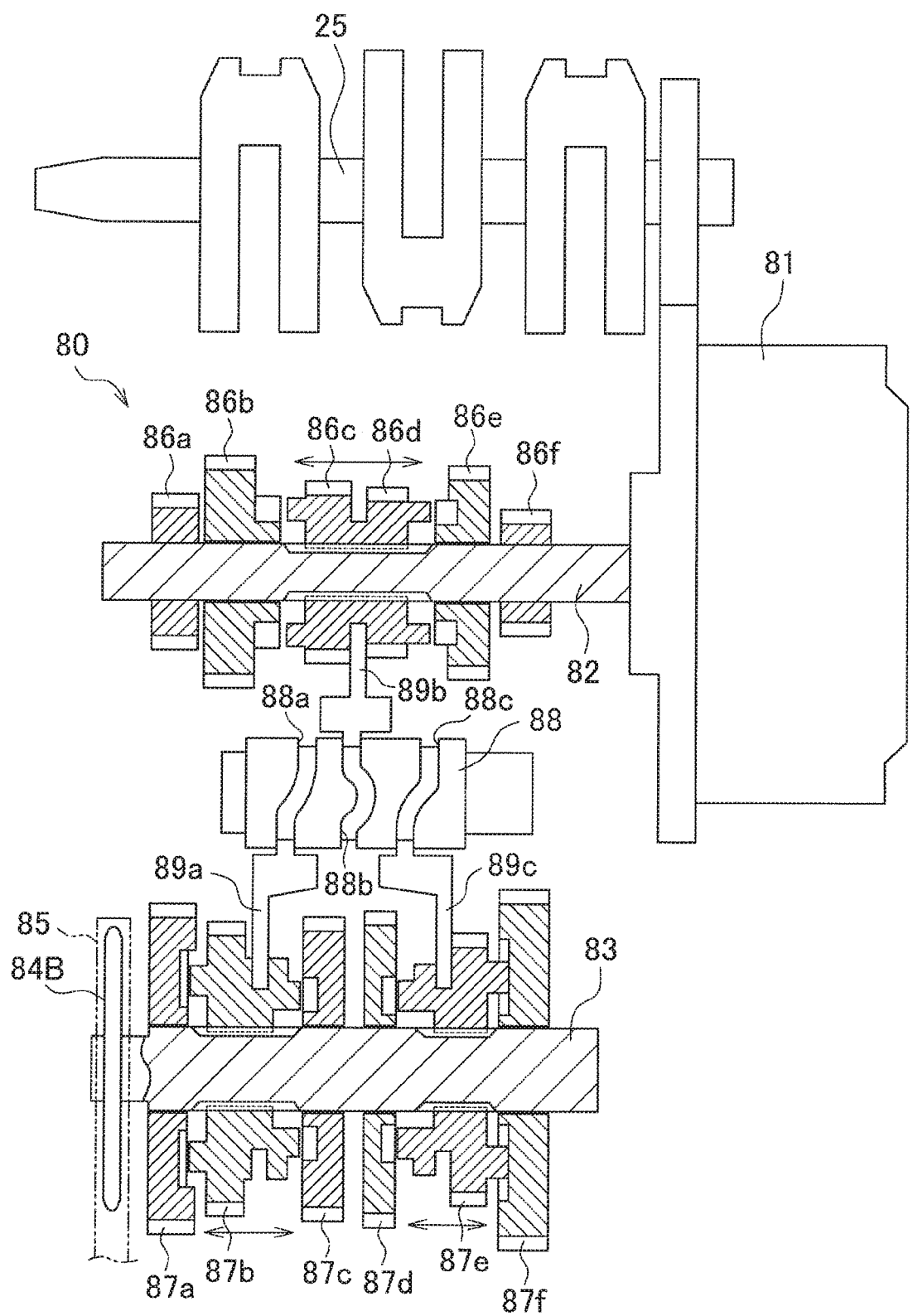
FIG. 5 is a schematic cross section of a transmission of the motorcycle of FIG. 2.

As shown in FIG. 5, the transmission 80 includes the input shaft 82 and the output shaft 83. It is noted that FIG. 5 is not a cross section cut along a single plane. FIG. 5 is a cross section passing the crankshaft 25, the input shaft 82, the output shaft 83, and a later-described shift cam 88. It is noted that FIG. 5 shows not cross sections but side faces of the crankshaft 25 and the later-described shift cam 88.

The input shaft 82 and the output shaft 83 are provided to be parallel to the crankshaft 25. The crankcase 21 rotatably supports the input shaft 82 and the output shaft 83. The power of the crankshaft 25 is transmitted to the output shaft 83 via the input shaft 82. As shown in FIG. 2, the drive sprocket 84B is provided on the output shaft 83. The driven sprocket 84A is provided on the axle shaft of the rear wheel 2Re (driving wheel 2D). A chain 85 is wound on the drive sprocket 84B and the driven sprocket 84A. The power is transmitted from the output shaft 83 to the rear wheel 2Re via the chain 85. With this arrangement, the rear wheel 2Re (driving wheel 2D) rotates. Pulleys and a belt may be used in place of the sprockets 84B and 84A and the chain 85. The ratio of the rotation speed of the rear wheel 2Re to the rotation speed of the output shaft 83 is identical with the ratio of the diameter of the drive sprocket 84B to the diameter of the driven sprocket 84A. The ratio of the rotation speed of the rear wheel 2Re to the rotation speed of the output shaft 83 is identical with the ratio of the number of teeth of the drive sprocket 84B to the number of teeth of the driven sprocket 84A. Hereinafter, the drive sprocket 84B and the driven sprocket 84A are collectively termed wheel driving sprockets 84.

The diameter of the driven sprocket 84A may be changed by replacement of the driven sprocket 84A. When the diameter of the driven sprocket 84A is changed, the rotation speed of the driven sprocket 84A is changed even though the rotation speed of the drive sprocket 84B remains the same. In other words, the rotation speed of the wheel 2 is changed. When the conditions other than the diameter of the driven sprocket 84A remain the same, the rotation speed of the wheel 2 increases as the diameter of the driven sprocket 84A decreases. The diameter of the drive sprocket 84B may be changed by replacement, too. When the diameter of the drive sprocket 84B is changed, the rotation speed of the driven sprocket 84A is changed even though the rotation speed of the drive sprocket 84B remains the same. In other words, the rotation speed of the wheel 2 is changed. When the conditions other than the diameter of the drive sprocket 84B remain the same, the rotation speed of the wheel 2 increases as the diameter of the drive sprocket 84B increases.

The transmission 80 includes a clutch 81. The clutch 81 is provided on the input shaft 82. The clutch 81 is switchable between a connection state and a cut-off state by an operation of the clutch lever. The clutch 81 is controlled by the ECU 90 based on the degree of movement of the clutch lever detected by the clutch sensor 17. Instead of providing the clutch sensor 17, the clutch 81 may be connected to the clutch lever by wire. When the rider does not grip the clutch lever, the clutch 81 is in the connection state. When the clutch 81 is in the connection state, the clutch 81 transmits power input from the crankshaft 25 to the input shaft 82. On this account, a variation of the rotation speed of the input shaft 82 is synchronized with a variation of the rotation speed of the crankshaft 25. When the degree of movement of the clutch lever is almost maximum, the clutch 81 is in the cut-off state. When the clutch 81 in the cut-off state, the clutch 81 does not transmit power input from the crankshaft 25 to the input shaft 82. When the input shaft 82 is rotating, the rotation speed of the input shaft 82 is not synchronized with the rotation speed of the crankshaft 25. When the degree of movement of the clutch lever falls within a predetermined range which is smaller than the maximum degree, the clutch 81 is in a half clutch state. When the clutch 81 is in the half clutch state, the clutch 81 transmits part of power input from the crankshaft 25 to the input shaft 82. The clutch 81 is a typical clutch such as a friction clutch, for example. The description of the specific structure of the clutch 81 is omitted.

Six shift gears 86a, 86b, 86c, 87d, 86e, and 86f are attached to the input shaft 82. The shift gears 86a, 86b, 86c, 87d, 86e, and 86f are different from one another in number of teeth. Six shift gears 87a, 87b, 87c, 87d, 87e, and 87f are attached to the output shaft 83. The shift gears 87a, 87b, 87c, 87d, 87e, and 87f are different from one another in number of teeth. The six shift gears 86a to 86f of the input shaft 82 are engaged with the six shift gears 87a to 87f of the output shaft 83, respectively. The shift gears 86b and 86e are provided on the input shaft 82 to be able to idle. The shift gears 87b and 87e respectively engaged with the shift gears 86b and 86e rotate together with the output shaft 83. The shift gears 87a, 87c, 87d, and 87f are provided on the output shaft 83 to be able to idle. The shift gears 86a, 86c, 86d, and 86f respectively engaged with the shift gears 87a, 87c, 87d, and 87f rotate together with the input shaft 82.

The shift gears 86c and 86d are attached to the input shaft 82 to be movable in the axial direction. The shift gears 86c and 86d are connected to each other and move together in the axial direction. The shift gears 87b and 87e are attached to the output shaft 83 to be movable in the axial direction. Hereinafter, the shift gears 86c, 86d, 87b, and 87e will be referred to as movable shift gears. A side face of the movable shift gear 86c can be engaged with a side face of the shift gear 86b which faces the movable shift gear 86c in the axial direction. A side face of the movable shift gear 86d can be engaged with a side face of the shift gear 86e which faces the movable shift gear 86d in the axial direction. Side faces of the movable shift gear 87b can be engaged with side faces of the shift gears 87a and 87c which face the movable shift gear 87b in the axial direction. Side faces of the movable shift gear 87e can be engaged with side faces of the shift gears 87d and 87f which face the movable shift gear 87e in the axial direction.

When the clutch 81 is in the connection state and a movable shift gear is engaged with a shift gear facing the movable shift gear in the axial direction, these two shift gears rotate together. As a result, the power input to the input shaft 82 is transmitted to the output shaft 83. For example, when the movable shift gear 87e is engaged with the shift gear 87d, the power input to the input shaft 82 is transmitted to the output shaft 83 via the shift gears 86d, 87d, and 87e. The ratio of the rotation speed of the input shaft 82 to the rotation speed of the output shaft 83 is varied depending on which two shift gears are engaged as a combination. The ratio of the rotation speed of the input shaft 82 to the rotation speed of the output shaft 83 is termed a gear ratio of the transmission 80. For example, when the movable shift gear 87e is engaged with the shift gear 87d, the gear ratio is equal to the gear ratio of the shift gear 87d of the output shaft 83 to the shift gear 86d of the input shaft 82.

The transmission 80 allows selection of one of six gear ratios. The transmission 80 includes six selectable gear positions which are different from one another in gear ratio. The six gear positions are a 1st position, a 2nd position, a 3rd position, a 4th position, a 5th position, and a 6th position which are in the descending order of the gear ratio. A position where none of the movable shift gear is engaged with a shift gear which opposes the movable shift gear in the axial direction is termed a neutral position. The transmission 80 is in the neutral position when the gear position is none of the 1st position to the 6th position. When the transmission 80 is in one of these gear positions, power is transmitted from the input shaft 82 to the output shaft 83. In other words, when the transmission 80 is one of the gear positions, the transmission 80 transmits the power input from the crankshaft 25 to the rear wheel 2 (driving wheel 2D). A gear position with a low gear ratio is typically used when the vehicle speed is high, whereas a gear position with a high gear ratio is typically used when the vehicle speed is low. When the transmission 80 is in the neutral position, no power is transmitted from the input shaft 82 to the output shaft 83. In other words, the transmission 80 in the neutral position does not transmit the power input from the crankshaft 25 to the rear wheel 2Re (driving wheel 2D).

As shown in FIG. 5, as a mechanism for moving the movable shift gears 86c, 86d, 87b, and 87e in the axial direction, the transmission 80 has the shift cam 88 and three shift forks 89a, 89b, and 89c. The shift cam 88 is substantially a cylindrical prism in shape. The shift cam is also termed as shift drum. The shift cam 88 has three annular cam grooves 88a, 88b, and 88c in the outer circumferential surface. One end portions of the three shift forks 89a to 89c are inserted into the three cam grooves 88a to 88c, respectively. The other end portion of the shift fork 89b is engaged with the outer circumferential surfaces of the movable shift gears 86c and 86d. The other end portions of the shift forks 89a and 89c are engaged with the outer circumferential surfaces of the movable shift gears 87b and 87e, respectively. At least part of the cam groove 88a is inclined with respect to the direction perpendicular to the axial direction of the input shaft 82 and the output shaft 83. The same applies to the cam groove 88b and the cam groove 88c. With this arrangement, as the shift cam 88 rotates, the three shift forks 89a to 89c move in the axial direction along the cam grooves 88a to 88c, respectively. With this, the movable shift gears 86c, 86d, 87b, and 87e move in the axial direction and the gear position of the transmission 80 is changed. The shift cam 88 is rotationally driven in forward and reverse directions by an unillustrated shift actuator. As the rider operates a shift pedal (not illustrated), the shift actuator is controlled by the later-described ECU 90. As a result, the rotational angle of the shift cam 88 is controlled.

As shown in FIG. 3 and FIG. 6, the engine unit 11 includes the gear position sensor 77. The gear position sensor 77 is housed in the crankcase 21. The gear position sensor 77 is provided in the vicinity of the shift cam 88. The gear position sensor 77 is provided to be adjacent to the shift cam 88 in the radial direction of the shift cam 88. The gear position sensor 77 may be provided to be adjacent to the shift cam 88 in the axial direction of the shift cam 88. The gear position sensor 77 is configured to detect the gear position of the transmission 80 based on the rotational position of the shift cam 88. In other words, the gear position sensor 77 is configured to detect which one of the 1st position to the 6th position the gear position of the transmission 80 is. Furthermore, the gear position sensor 77 detects that the transmission 80 is in the neutral position, based on the rotational position of the shift cam 88. The way of detecting the gear position sensor 77 is not limited to any particular one. The gear position sensor 77 may be a contact type or a contactless type. For example, the gear position sensor 77 may be a magnetic sensor. For example, the gear position sensor 77 may be a rotary switch. The rotary switch has a rotary contact and a plurality of fixed contacts. The rotary contact is connected to a ground terminal. The rotary contact rotates in sync with the rotation of the shift cam 88. The fixed contacts are fixed contacts corresponding to the six gear positions, respectively, and a fixed contact corresponding to the neutral position. The fixed contacts are connected to resistors with different resistance values. The fixed contacts are provided on the track of the rotation of the rotary contact. The rotary contact is connected to one of the fixed contacts as a result of the rotation. As a result, the gear position sensor 77 outputs a different electrical signal for each gear position.

The crankcase 21 houses a starter motor 38 (see FIG. 3) and a generator (not illustrated). The starter motor 38 and the generator are connected to the crankshaft 25. The starter motor 38 is driven by electric power from a battery. The starter motor 38 rotates the crankshaft 25 at the start of the engine unit 11. The generator generates electric power by the rotational force of the crankshaft 25. The battery is charged with the generated electric power. The starter motor 38 and the generator may be integrated.

Three cylinder holes 22a (see FIG. 4 and FIG. 6) are formed in the cylinder body 22. The three cylinder holes 22a are lined up to form a single line in the left-right direction. A piston 26 is slidably housed in each cylinder hole 22a. The three pistons 26 are connected to one crankshaft 25 via three connecting rods 27 (see FIG. 4). In the cylinder body 22, a cooling passage 22b is provided around the three cylinder holes 22a to allow coolant water to flow in the cooling passage 22b (see FIG. 4). The engine unit 11 includes a coolant water temperature sensor 72 configured to detect the temperature of the coolant water in the cooling passage 22b. The coolant water temperature sensor 72 indirectly detects the temperature of the engine main body 20.

The engine main body 20 includes three combustion chambers 28 (see FIG. 4 and FIG. 6). Each combustion chamber 28 is formed by the lower surface of the cylinder head 23, the cylinder hole 22a, and the piston 26. A leading end portion of an ignition plug 29 is provided in the combustion chamber 28 (see FIG. 4). The ignition plug 29 is configured to ignite a mixture gas of fuel and air in the combustion chamber 28. The ignition plug 29 is connected to an ignition coil 30. The ignition coil 30 stores electric power to cause spark discharge of the ignition plug 29.

As shown in FIG. 4 and FIG. 6, the cylinder head 23 includes an intake passage 31 and an exhaust passage 32 which are provided for each combustion chamber 28. The intake passage 31 introduces air into the combustion chamber 28. The exhaust passage 32 exhausts combustion gas (exhaust gas) generated in the combustion chamber 28 during a combustion process. The intake passage 31 is opened and closed by an intake valve 33. The exhaust passage 32 is opened and closed by an exhaust valve 34. The intake valve 33 and the exhaust valve 34 are driven by a valve driving device (not illustrated). The valve driving device is housed in the cylinder head 23. The valve driving device operates in sync with the crankshaft 25.

As shown in FIG. 4, the intake unit 50 includes an intake passage member 51 and three branched intake passage members 52. In this specification, a passage member is a structure forming a passage. A passage is a space through which gas or the like passes. One end of the intake passage member 51 is open to the atmosphere. The intake passage member 51 is connected to the three branched intake passage members 52. An air filter 53 is provided in the intake passage member 51. The internal passages of the three branched intake passage members 52 are connected to three intake passages 31 of the cylinder head 23, respectively. Air taken from the one end of the intake passage member 51 is supplied to the engine main body 20 via the three branched intake passage members 52.

As shown in FIG. 4, the engine unit 11 includes an injector 35 which is configured to supply fuel to the combustion chamber 28. One injector 35 is provided for each combustion chamber 28. The injector 35 is connected to a fuel tank 10 via a fuel hose 36. A fuel pump 37 is provided inside the fuel tank 10. The fuel pump 37 supplies fuel in the fuel tank 10 to the fuel hose 36 with pressure.

As shown in FIG. 4, a throttle valve 54 is provided in the branched intake passage member 52. The opening degree of the throttle valve 54 is changed as the rider rotationally operates the accelerator grip 14. The throttle valve 54 may be connected to the accelerator grip 14 by an unillustrated throttle wire. The throttle valve 54 may be an electronic throttle valve which is arranged such that the opening degree is controlled by the ECU 90 in accordance with an operation of the accelerator grip 14.

As shown in FIG. 4, the motorcycle 1 includes a throttle position sensor 73, an intake pressure sensor 74, and an intake temperature sensor 75. These three sensors are provided at the branched intake passage member 52. The throttle position sensor 73 is configured to detect the opening degree of the throttle valve 54. To be more specific, the throttle position sensor 73 is configured to detect the position of the throttle valve 54. The intake pressure sensor 74 is configured to detect the pressure in the branched intake passage member 52. The intake temperature sensor 75 is configured to detect the temperature of air in the branched intake passage member 52.

As shown in FIG. 2 and FIG. 4, the exhaust unit 60 includes three independent exhaust passage members 61, a collective exhaust passage member 62, and a muffler member 63. The internal passages of the three independent exhaust passage members 61 are connected to three exhaust passages 32 of the cylinder head 23, respectively. The three independent exhaust passage members 61 are connected to the collective exhaust passage member 62. The collective exhaust passage member 62 is connected to the muffler member 63. The muffler member 63 is a device for reducing noise generated by exhaust gas. As shown in FIG. 2, the muffler member 63 houses a catalyst 64 which purifies exhaust gas. The exhaust gas exhausted from the three exhaust passage members 32 of the engine main body 20 passes the three independent exhaust passage members 61 and the collective exhaust passage member 62 and then flows into the muffler member 63. The exhaust gas having flown into the muffler member 63 is purified by the catalyst 64 and is then discharged to the atmosphere. As shown in FIG. 2, an oxygen sensor 76 is provided at the collective exhaust passage member 62. The oxygen sensor 76 is configured to detect the oxygen density in the exhaust gas.

(3) Structure of ECU (3-1) Overall Structure of ECU

The motorcycle 1 includes the ECU (Electronic Control Unit) 90 which is configured to control the components of the motorcycle 1. The ECU 90 may be a single device provided at a single position. The ECU 90 may be formed of a plurality of devices which are positionally separated from one another and are electrically connected to one another by wire or in a wireless manner. As shown in FIG. 3, the ECU 90 is connected to sensors such as the wheel speed sensor 16, the clutch sensor 17, the crankshaft sensor 71, and the gear position sensor 77. The ECU 90 is connected to members such as the ignition coil 30, the injector 35, the fuel pump 37, the starter motor 38, the generator (not illustrated), the display 15, the engine start switch 18, and the engine stop switch 19.

The ECU 90 includes a processor (arithmetic processing unit) such as a CPU (Central Processing Unit) and storage devices (storages) such as a ROM (Read Only Memory) and a RAM (Random Access Memory). The storage devices store information necessary for processes executed by the processor. The storage devices store data such as programs executed by the processor and parameters required for executing the programs. A storage device (e.g., RAM) is used as a work area when the processor executes a program. When a program stored in the storage device is executed by the processor, functional units are embodied. To put it differently, the ECU 90 is arranged to embody functional units. When the processor is a programmable processor, the processor may be programmed to execute the series of processes below.

As shown in FIG. 3, as functional units, the ECU 90 includes members such as a vehicle speed calculation unit 91, a fuel supply amount control unit 92, an ignition timing controlling unit 93, a gear position estimation unit 94, a gear position sensor abnormality detection unit 95, an idling stop control unit 98, and a restart control unit 99. The gear position sensor abnormality detection unit 95 includes a high-speed gear position abnormality determination unit 96 and a low-speed gear position abnormality determination unit 97.

As shown in FIG. 3, the ECU 90 includes an operation instruction unit 100. Based on results of information processing by the functional units, the operation instruction unit 100 sends operation command signals to members such as the ignition coil 30, the injector 35, the fuel pump 37, the starter motor 38, the generator, and the display 15.

(3-2) Vehicle Speed Calculation Unit

The vehicle speed calculation unit 91 is configured to detect vehicle speed based on rotation speed of the wheel 2 detected by the wheel speed sensor 16. To be more specific, the vehicle speed is detected based on the rotation speed of the wheel 2 and the outer diameter of the wheel 2 stored in advance in the ROM, etc. The detected vehicle speed is displayed on the display 15. The detected vehicle speed may be used for drive control of the motorcycle 1. To be more specific, the detected vehicle speed may be used for controlling a fuel supply amount by the fuel supply amount control unit 92, which will be described later. Furthermore, the detected vehicle speed may be used for controlling an ignition timing by the ignition timing controlling unit 93, which will be described later.

(3-3) Fuel Supply Amount Control Unit and Ignition Timing Controlling Unit)

The fuel supply amount control unit 92 is configured to determine a fuel supply amount of fuel supplied by the injector 35. To be more specific, the fuel supply amount control unit 92 controls a fuel injection time of the injector 35. The fuel supply amount control unit 92 determines the fuel supply amount based on signals from the sensors 71 to 77, etc. The operation instruction unit 100 is configured to send an operation command signal based on the determined fuel supply amount to the fuel pump 37 and the injector 35. In response to this, the injector 35 injects fuel, the amount of which has been determined by the fuel supply amount control unit 92.

The ignition timing controlling unit 93 is configured to determine an ignition timing. The ignition timing indicates a timing at which the ignition plug 29 discharges electricity. The ignition timing controlling unit 93 determines the ignition timing based on signals from the sensors 71 to 77, etc. The operation instruction unit 100 sends, to the ignition coil 30, an operation command signal based on the ignition timing determined by the ignition timing controlling unit 93. As a result, the ignition plug 29 performs spark discharge at a predetermined timing.

When the engine start switch 18 is turned on, the ECU 90 generates an engine start command signal. The engine start command signal is sent to the operation instruction unit 100, the fuel supply amount control unit 92, and the ignition timing controlling unit 93. Upon receiving the engine start command signal, the operation instruction unit 100 activates the starter motor 38. Upon receiving the engine start command signal, the fuel supply amount control unit 92 and the ignition timing controlling unit 93 determine the fuel supply amount and the ignition timing and send signals to the operation instruction unit 100. Then the operation instruction unit 100 drives the ignition coil 30, the fuel pump 37, and the injector 35. Consequently, the engine unit 11 is started.

When the engine stop switch 19 is turned on, the ECU 90 generates an engine stop command signal. The engine stop command signal is sent to the operation instruction unit 100. Upon receiving the engine stop command signal, the operation instruction unit 100 stops the spark discharge of the ignition plug 29 and stops the fuel injection from the injector 35. Consequently, the engine unit 11 is stopped. The engine stop command signal is generated also in cases other than the turn-on of the engine stop switch 19.

(3-4) Idling Stop Control Unit and Restart Control Unit

When a predetermined idling stop condition is satisfied while the engine unit 11 is driven, the idling stop control unit 98 stops the engine unit 11. The idling stop control unit 98 therefore stops the engine unit 11 at the time of idling. Hereinafter, a state in which the engine unit 11 is stopped because the idling stop condition is satisfied will be referred to as an idling stop state. When the predetermined idling stop condition is satisfied, the idling stop control unit 98 sends an idling stop command signal to the operation instruction unit 100. Upon receiving the idling stop command signal, the operation instruction unit 100 stops the spark discharge of the ignition plug 29 and stops the fuel injection from the injector 35. Consequently, the engine unit 11 is stopped.

The following will describe an example of the idling stop condition. The idling stop condition is, for example, that all of the following conditions A1 to A5 continue for a predetermined time. The predetermined time is three seconds, for example. The idling stop condition may be one or more of the conditions A1 to A5.

A1: The throttle opening degree falls within a predetermined idling opening degree range (e.g., less than 0.3 degree).

A2: The vehicle speed is equal to or lower than a predetermined value (e.g., 3 km/h or less).

A3: The engine rotation speed falls within a predetermined idling rotation speed range (e.g., 2000 rpm or less).

A4: The engine temperature is equal to or higher than a predetermined value (e.g., 60 degrees centigrade).

A5: The remaining amount of the battery is equal to or higher than a predetermined value.

When a predetermined restart condition is satisfied in the idling stop state, the restart control unit 99 restarts the engine unit 11. The restart condition is, for example, that the throttle opening degree becomes equal to or higher than a predetermined opening degree. In this case, the engine unit 11 is restarted as the rider operates an accelerator grip (not illustrated).

When the predetermined restart condition is satisfied, the restart control unit 99 sends a restart command to the operation instruction unit 100. Upon receiving the restart command, the operation instruction unit 100 activates the starter motor 38. Furthermore, when the predetermined restart condition is satisfied, the restart control unit 99 starts the control of the fuel supply amount by the fuel supply amount control unit 92 and the control of the ignition timing by the ignition timing controlling unit 93. Consequently, the engine unit 11 is restarted.

(3-5) Gear Position Estimation Unit

Figure 7:
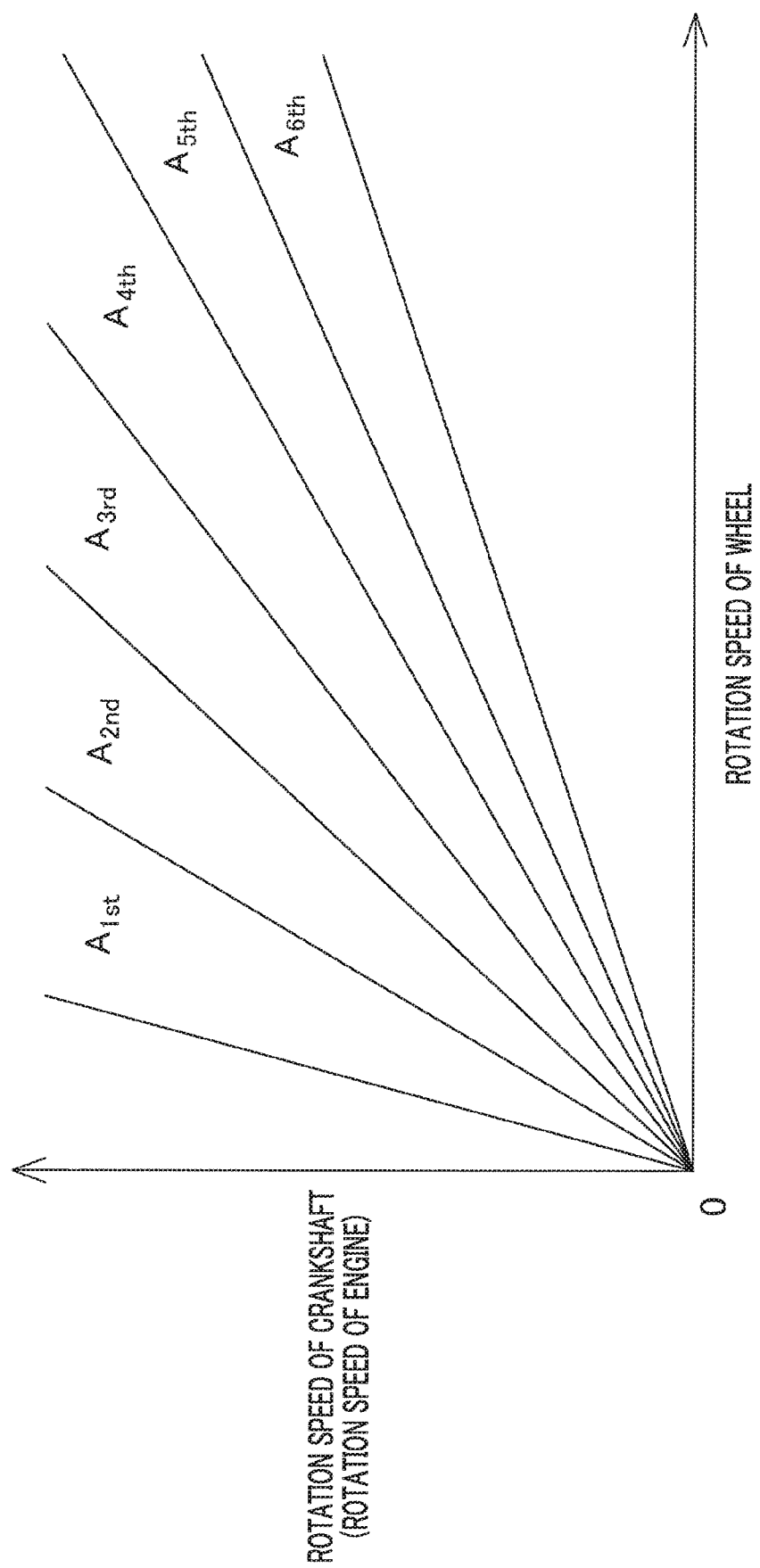
FIG. 7 is a gear position estimation map used for estimating a gear position.

The gear position estimation unit 94 is configured to estimate the gear position of the transmission 80 based on a signal from the crankshaft sensor 71 and a signal from the wheel speed sensor 16. The wheel speed sensor 16 used for the estimation may be the rear wheel speed sensor 16Re or the front wheel speed sensor 16F. Hereinafter, the gear position estimated by the gear position estimation unit 94 is termed an estimated gear position. The gear position estimation unit 94 figures out the estimated gear position by using a gear position estimation map. FIG. 7 schematically shows the gear position estimation map. The gear position estimation map is stored in the ROM in advance. The way of storing the gear position estimation map in the ROM is not limited to any particular one. The gear position estimation map is a lookup table in which a gear position is set relative to rotation speed of the crankshaft 25 and rotation speed of the wheel 2.

As shown in FIG. 7, in the gear position estimation map, six gear position estimation regions ($A_{1st}$, $A_{2nd}$, $A_{3rd}$, $A_{4th}$, $A_{5th}$, and $A_{6th}$) are set to correspond to the 1st position to the 6th position, respectively. These six gear position estimation regions do not overlap one another. The gear position estimation map takes advantage of the fact that the rotation speed of the crankshaft 25 is in proportion to the rotation speed of the wheel 2 at a specific gear ratio. The gear ratio of each gear position of the actual transmission 80 is a single value. However, in the gear position estimation map, the gear ratio of each gear position is set as a range. In other words, in the gear position estimation map, a range of the rotation speed of the crankshaft 25 and a range of the rotation speed of the wheel 2 are set for each gear position. With this arrangement, the gear position can be estimated even when variation exists in detection results of the crankshaft sensor 71 and/or the wheel speed sensor 16. When the gear position is changed, it takes time until a detection signal of the wheel speed sensor 16 is converged to a signal of the rotation speed of the wheel 2 specified by the gear position after the change and the rotation speed of the crankshaft 25. It is therefore possible to swiftly estimate the gear position when the gear ratio of each gear position is set as a range in the gear position estimation map.

When the transmission 80 is in the neutral position, the ratio of the rotation speed of the input shaft 82 to the rotation speed of the output shaft 83 is not constant. On this account, when the transmission 80 is in the neutral position, the signal from the crankshaft sensor 71 and the signal from the wheel speed sensor 16 may or may not fall within the six gear position estimation regions ($A_{1st}$ to $A_{6th}$) shown in FIG. 7. Being similar to the case where the transmission 80 is in the neutral position, when the clutch 81 is either in the cut-off state or in the half clutch state, the signal from the crankshaft sensor 71 and the signal from the wheel speed sensor 16 may or may not fall within the six gear position estimation regions ($A_{1st}$ to $A_{6th}$) shown in FIG. 7. On this account, when the transmission 80 is in the neutral position or when the clutch 81 of the transmission 80 is in the cut-off state or the half clutch state, the gear position estimation unit 94 cannot estimate the correct gear position. When the signal from the crankshaft sensor 71 and the signal from the wheel speed sensor 16 do not fall within the six gear position estimation regions ($A_{1st}$ to $A_{6th}$), the gear position estimation unit 94 estimates that either the transmission 80 is in the neutral position or the clutch 81 is in the cut-off state or the half clutch state.

The estimated gear position is used by the gear position sensor abnormality detection unit 95 to detect an abnormality in the gear position sensor 77. Furthermore, the estimated gear position is used for controlling the driving of the motorcycle 1. To be more specific, the estimated gear position may be used for the control of the fuel supply amount by the fuel supply amount control unit 92. Furthermore, the estimated gear position may be used for the control of the ignition timing by the ignition timing controlling unit 93.

As described above, when the diameter of the wheel driving sprocket 84 is changed, the rotation speed of the wheel 2 is changed even if the rotation speed of the crankshaft 25 and the gear position of the transmission 80 remain the same. To be more specific, the rotation speed of the wheel 2 increases as the diameter of the driven sprocket 84A decreases. Meanwhile, the rotation speed of the wheel 2 increases as the diameter of the drive sprocket 84B increases. The gear position estimation map (see FIG. 7), however, is prepared with the assumption that the ratio of the rotation speed of the output shaft 83 to the rotation speed of the wheel 2 is constant. In other words, the gear position estimation unit 94 estimates the gear position based on the rotation speed of the wheel 2 and the rotation speed of the crankshaft 25, with the assumption that the ratio of the rotation speed of the output shaft 83 to the rotation speed of the wheel 2 is constant. For this reason, when the ratio of the rotation speed of the output shaft 83 to the rotation speed of the wheel 2 is changed, the estimated gear position may be different from the actual gear position.

Figure 8:
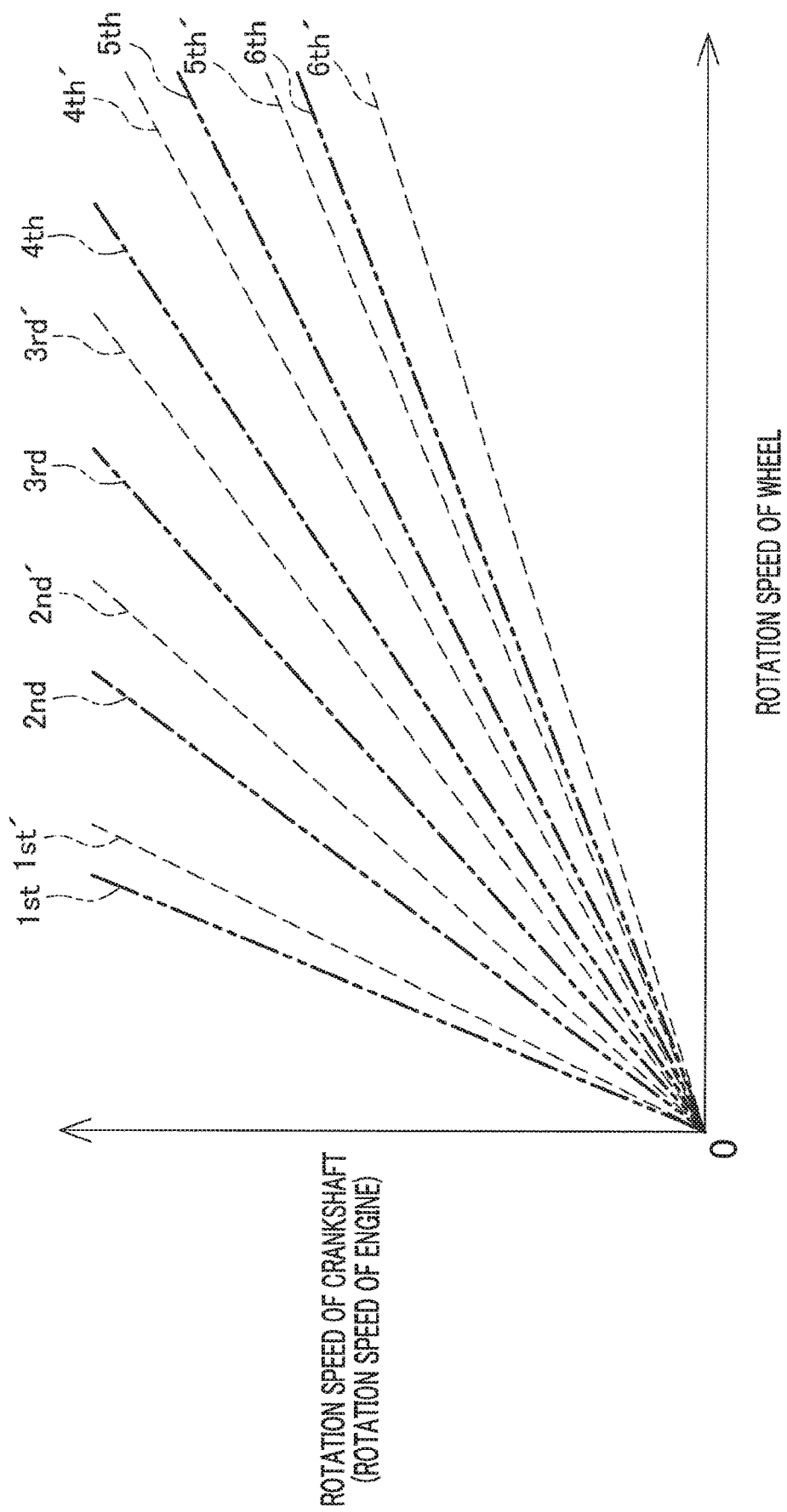
FIG. 8 shows graphs of the relationship between the rotation speed of a wheel and the rotation speed of a crankshaft.

FIG. 8 shows graphs of the relationship between the rotation speed of the wheel 2 and the rotation speed of the crankshaft 25 before and after a change in diameter of the wheel driving sprocket 84. The graphs show an example when the diameter of the driven sprocket 84A is decreased or when the diameter of the drive sprocket 84B is increased. Furthermore, the graphs show data in a steady operation state. The steady operation state is a state in which the vehicle speed is substantially constant. The graphs indicated by two-dot chain lines in FIG. 8 are graphs before the change in diameter of the wheel driving sprocket 84. The reference symbols 1st, 2nd, 3rd, 4th, 5th, and 6th in FIG. 8 indicate the graphs of the 1st position, the 2nd position, the 3rd position, the 4th position, the 5th position, and the 6th position before the change in diameter of the wheel driving sprocket 84. The graphs indicted by dotted lines in FIG. 8 are graphs after the change in diameter of the wheel driving sprocket 84. The reference symbols 1st', 2nd', 3rd', 4th', 5th', and 6th' in FIG. 8 indicate the graphs of the 1st position, the 2nd position, the 3rd position, the 4th position, the 5th position, and the 6th position after the change in diameter of the wheel driving sprocket 84. As shown in FIG. 8, the higher the gear ratio of a gear position is, the smaller an amount of change of the rotation speed of the wheel 2 on account of the change in diameter of the wheel driving sprocket 84 is.

Figure 9:
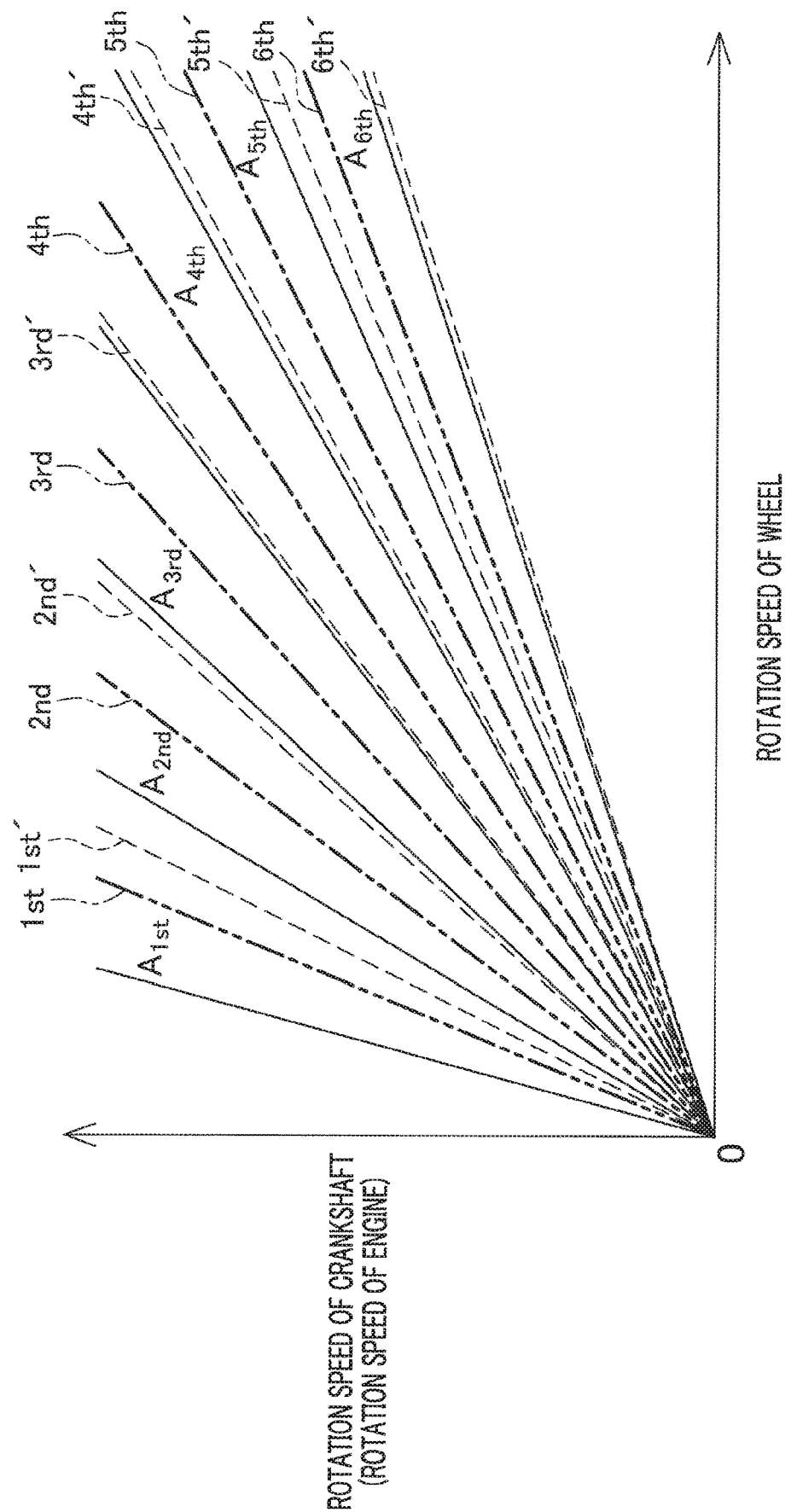
FIG. 9 shows a state in which the graphs in FIG. 8 are superimposed onto the gear position estimation map of FIG. 7.

FIG. 9 shows a state in which the graphs in FIG. 8 are superimposed onto the gear position estimation map of FIG. 7. According to FIG. 9, the graphs (1st' and 2nd') of the 1st position and the 2nd position after the change in diameter of the wheel driving sprocket 84 are inside the corresponding gear position estimation regions ($A_{1st}$ and $A_{2nd}$). Meanwhile, the graphs (3rd' to 6th') of the 3rd position to the 6th position after the change in diameter of the wheel driving sprocket 84 are outside the corresponding gear position estimation regions ($A_{3rd}$ to $A_{6th}$). Therefore, in the example shown in FIG. 9, when the gear position of the transmission 80 is the 1st position or the 2nd position, the gear position estimated by the gear position estimation unit 94 is identical with the actual gear position. Meanwhile, when the gear position of the transmission 80 is one of the 3rd position to the 6th position, the gear position estimated by the gear position estimation unit 94 may be different from the actual gear position. As such, when the gear ratio of the gear position of the transmission 80 is high, the accuracy of the estimation of the gear position by the gear position estimation unit 94 is high even after the diameter of the wheel driving sprocket 84 is changed. Meanwhile, when the gear ratio of the gear position of the transmission 80 is low, the accuracy of the estimation of the gear position by the gear position estimation unit 94 is low after the diameter of the wheel driving sprocket 84 is changed.

(3-6) Gear Position Sensor Abnormality Detection Unit

An abnormality in the gear position sensor 77 can be detected by a way in which a gear position detected by the gear position sensor 77 is compared with an estimated gear position. However, as described above, when the gear ratio of the gear position of the transmission 80 is low, the accuracy of the estimation of the gear position by the gear position estimation unit 94 is low after the diameter of the wheel driving sprocket 84 is changed. On this account, according to the above-described abnormality detection way, an abnormality is erroneously detected even when the gear position sensor 77 operates normally, when the gear ratio of the gear position of the transmission 80 is low. On this account, the gear position sensor abnormality detection unit 95 uses a different way of abnormality determination in the gear position sensor 77 in accordance with a gear position detected by the gear position sensor 77. The gear position sensor abnormality detection unit 95 includes the high-speed gear position abnormality determination unit 96 and the low-speed gear position abnormality determination unit 97.

The six gear positions are classified into the high-speed gear position class and the low-speed gear position class. The high-speed gear position class includes the gear position having the lowest gear ratio. The low-speed gear position class is constituted by at least one gear position having a higher gear ratio than gear ratios of the gear positions in the high-speed gear position class. In the present embodiment, the high-speed gear position class includes the 3rd position, the 4th position, the 5th position, and the 6th position whereas the low-speed gear position class includes the 1st position and the 2nd position. When the gear position sensor 77 detects one of the gear positions in the high-speed gear position class, the high-speed gear position abnormality determination unit 96 performs a process of abnormality determination in the gear position sensor 77. When the gear position sensor 77 detects one of the gear positions in the low-speed gear position class, the low-speed gear position abnormality determination unit 97 performs a process of abnormality determination in the gear position sensor 77. When the gear position sensor 77 detects the neutral position, the high-speed gear position abnormality determination unit 96 performs a process of abnormality determination in the gear position sensor 77.

When the gear position sensor abnormality detection unit 95 detects an abnormality of the gear position sensor 77, the ECU 90 causes the display 15 to display a warning. This can notify the rider of the abnormality. The warning may be displayed when there is an abnormality in any of the devices of the motorcycle 1. In other words, the warning may not specify that the device in which the abnormality occurs is the gear position sensor 77. The warning may be displayed only when an abnormality is detected in the gear position sensor 77. In other words, the warning may specify that the device in which the abnormality occurs is the gear position sensor 77. The motorcycle 1 may include a notification unit configured to notify the rider of an abnormality, in addition to the display 15. The notification unit may be configured to give a notification by sound or light, for example.

(3-6-1) High-Speed Gear Position Abnormality Determination Unit

The high-speed gear position abnormality determination unit 96 determines that there is an abnormality in the gear position sensor 77 when the unit detects the shift of the motorcycle 1 from the stopped state to the running state while the gear position sensor 77 detects one of the gear positions in the high-speed gear position class. Furthermore, the high-speed gear position abnormality determination unit 96 determines that there is an abnormality in the gear position sensor 77 when the unit detects the shift of the motorcycle 1 from the stopped state to the running state while the gear position sensor 77 detects the neutral position.

To be more specific, the high-speed gear position abnormality determination unit 96 counts the number of times of detection of the shift of the motorcycle 1 from the stopped state to the running state while the gear position sensor 77 detects one of the gear positions in the high-speed gear position class or the neutral position. Each time the shift is detected, the count is incremented by one. The high-speed gear position abnormality determination unit 96 determines that there is an abnormality in the gear position sensor 77 when the count reaches a predetermined number which is two or more. The predetermined number may be three, for example.

Whether detection results of the gear position sensor 77 are identical between the counts is not part of the condition of the abnormality determination. For example, even when the gear position detected at the time of the first count is different from the gear position detected at the time of the second count, it is determined that the gear position sensor 77 has an abnormality if the condition of the abnormality determination is satisfied. Furthermore, for example, even when the neutral position is detected at the time of the first count and a gear position in the high-speed gear position class is detected at the time of the second count, it is determined that the gear position sensor 77 has an abnormality if the condition of the abnormality determination is satisfied.

The high-speed gear position abnormality determination unit 96 detects the shift of the motorcycle 1 from the stopped state to the running state based on a signal of the wheel speed sensor 16. The shift of the motorcycle 1 from the stopped state to the running state indicates that the motorcycle 1 starts to run. The high-speed gear position abnormality determination unit 96 determines that the motorcycle 1 has shifted from the stopped state to the running state when the rotation speed of the wheel 2 detected by the wheel speed sensor 16 is changed from zero to a predetermined speed. To be more specific, the high-speed gear position abnormality determination unit 96 determines that the motorcycle 1 has shifted from the stopped state to the running state when the rotation speed of the wheel 2 detected by the wheel speed sensor 16 is changed from zero to the predetermined speed and the engine start switch 18 is in the on-state. The predetermined speed may be a rotation speed of the wheel 2 when the vehicle speed is about 20 km/h, for example. Hereinafter, a period during which the wheel speed sensor 16 detects that the rotation speed of the wheel 2 is changed from zero to the predetermined speed will be referred to as a start detection period. The start detection period is a period required to detect the shift of the motorcycle 1 from the stopped state to the running state.

Whether the gear position detected by the gear position sensor 77 during the start detection period is constant is not part of the condition of the abnormality determination. For example, even when the gear position detected by the gear position sensor 77 while the rotation speed of the wheel 2 is zero is the 5th position and the gear position detected by the gear position sensor 77 while the rotation speed of the wheel 2 is the predetermined speed is the 6th position, it is determined that the gear position sensor 77 has an abnormality if the condition of the abnormality determination is satisfied.

When the count reaches the predetermined number which is two or more, the high-speed gear position abnormality determination unit 96 determines that there is an abnormality in the gear position sensor 77 and resets the count to zero. The high-speed gear position abnormality determination unit 96 also resets the count to zero when one of the following two reset conditions is satisfied.

The first reset condition is detection of an unintended engine stall while the gear position sensor 77 detects one of the gear positions in the high-speed gear position class after the start detection period. To put it differently, the high-speed gear position abnormality determination unit 96 does not determine that there is an abnormality in the gear position sensor 77 when an unintended engine stall is detected while the gear position sensor 77 detects one of the gear positions in the high-speed gear position class after the start detection period in which the gear position sensor 77 detects one of the gear positions in the high-speed gear position class or the neutral position.

Whether a gear position detected by the gear position sensor 77 in the start detection period is identical with a gear position detected by the gear position sensor 77 when an unintended engine stall is detected may not be a condition of resetting the count. In other words, the count is reset to zero no matter whether the two gear positions are same or different. Alternatively, a condition that the two gear positions are the same may be the condition of resetting the count. In other words, the count is reset to zero when the two gear positions are the same, and the count is not reset to zero when the two gear positions are different.

An engine stall is a phenomenon whereby the engine unit 11 is stopped. The unintended engine stall is an engine stall which occurs even if the ECU 90 does not instruct the engine unit 11 to stop. The unintended engine stall may occur when, for example, the rider fails to correctly operate the shift pedal and the clutch lever. When the motorcycle 1 starts to run, the unintended engine stall may occur if a gear position with a low gear ratio is selected as the gear position of the transmission 80. The unintended engine stall does not encompass an engine stall which occurs due to an instruction of the ECU 90 to stop the engine unit 11. The unintended engine stall does not encompass the stop of the engine unit 11 by the idling stop control unit 98. The unintended engine stall does not encompass the stop of the engine unit 11 due to the turn-on of the engine stop switch 19.

The high-speed gear position abnormality determination unit 96 determines that an unintended engine stall has occurred, when both of the following two conditions are satisfied, for example. The first condition is that the rotation speed of the crankshaft 25 detected by a crankshaft sensor is zero. In other words, the first condition is for determining whether an engine stall has occurred. The second condition is that the ECU 90 has not generated an engine stop command signal or an idling stop command signal. The second condition may be that the engine stop switch 19 is in the off-state.

The second reset condition is detection of the shift of the motorcycle 1 from the stopped state to the running state while the gear position sensor 77 detects one of the gear positions in the low-speed gear position class. To put it differently, the high-speed gear position abnormality determination unit 96 resets the count when the unit detects the shift of the motorcycle 1 from the stopped state to the running state while the gear position sensor 77 detects one of the gear positions in the low-speed gear position class.

The high-speed gear position abnormality determination unit 96 basically performs the abnormality determination in the gear position sensor 77 each time the motorcycle 1 starts to run. Depending on the state of the motorcycle 1, the high-speed gear position abnormality determination unit 96 may not perform the abnormality determination in the gear position sensor 77 at the start of the running of the motorcycle 1.

(3-6-2) Low-Speed Gear Position Abnormality Determination Unit

The low-speed gear position abnormality determination unit 97 performs abnormality determination in the gear position sensor 77 when the engine start switch 18 is in the on-state. In other words, the gear position sensor abnormality detection unit 95 performs the abnormality determination in the gear position sensor 77 when the engine unit 11 is driven. The on-state of the engine start switch 18 is a condition to start the abnormality determination by the low-speed gear position abnormality determination unit 97. Determination of whether the engine start switch 18 is in the on-state may be included in the abnormality determination by the low-speed gear position abnormality determination unit 97.

The low-speed gear position abnormality determination unit 97 determines that there is an abnormality in the gear position sensor 77 when the gear position detected by the gear position sensor 77 is included in the low-speed gear position class and is different from the estimated gear position. To be more specific, the low-speed gear position abnormality determination unit 97 measures a duration of a state in which the gear position detected by the gear position sensor 77 is included in the low-speed gear position class and is different from the estimated gear position. When the measured duration is equal to or longer than a predetermined duration, the low-speed gear position abnormality determination unit 97 determines that there is an abnormality in the gear position sensor 77.

The low-speed gear position abnormality determination unit 97 does not directly compare the gear position detected by the gear position sensor 77 with the estimated gear position. When the gear position detected by the gear position sensor 77 is included in the low-speed gear position class and the estimated gear position is included in the high-speed gear position class, the gear position detected by the gear position sensor 77 is different from the estimated gear position. However, even when the estimated gear position is a gear position belonging to the high-speed gear position class, the gear position sensor 77 may not have an abnormality when the estimated gear position is the gear position with the highest gear ratio in the high-speed gear position class. On this account, the low-speed gear position abnormality determination unit 97 does not determine that there is an abnormality in the gear position sensor 77 when the gear position sensor 77 detects one of the gear positions in the low-speed gear position class and the estimated gear position is either the gear position with the highest gear ratio in the high-speed gear position class or a gear position having a higher gear ratio than that highest gear ratio. The low-speed gear position abnormality determination unit 97 determines that there is an abnormality in the gear position sensor 77 when the gear position sensor 77 detects one of the gear positions in the low-speed gear position class and the estimated gear position is a gear position with a lower gear ratio than the gear position with the highest gear ratio in the high-speed gear position class. To be more specific, the low-speed gear position abnormality determination unit 97 measures a duration of a state in which the gear position sensor 77 detects one of the gear positions in the low-speed gear position class and the estimated gear position is a gear position with a lower gear ratio than the gear position with the highest gear ratio in the high-speed gear position class. When the measured duration is equal to or longer than the predetermined duration, the low-speed gear position abnormality determination unit 97 determines that there is an abnormality in the gear position sensor 77. In the present embodiment, the gear position with the highest gear ratio in the high-speed gear position class is the 3rd position.

With this arrangement, the low-speed gear position abnormality determination unit 97 does not determine that there is an abnormality in the gear position sensor 77 when the gear position detected by the gear position sensor 77 is different from the estimated gear position but the detected gear position is adjacent to the estimated gear position in terms of the order of the gear ratios. To put it differently, the low-speed gear position abnormality determination unit 97 does not determine that there is an abnormality in the gear position sensor 77 when the gear position sensor 77 detects one of the gear positions in the low-speed gear position class and this gear position detected by the gear position sensor 77 is either identical with the estimated gear position or different from the estimated gear position but the detected gear position is adjacent to the estimated gear position in terms of the order of the gear ratios. The low-speed gear position abnormality determination unit 97 determines that there is an abnormality in the gear position sensor 77 when the gear position sensor 77 detects one of the gear positions in the low-speed gear position class and there is one or more gear position between the gear position detected by the gear position sensor 77 and the estimated gear position in terms of the order of the gear ratios. To be more specific, the low-speed gear position abnormality determination unit 97 measures a duration of a state in which the gear position sensor 77 detects one of the gear positions in the low-speed gear position class and there is one or more gear position between the gear position detected by the gear position sensor 77 and the estimated gear position in terms of the order of the gear ratios. When the measured duration is equal to or longer than the predetermined duration, the low-speed gear position abnormality determination unit 97 determines that there is an abnormality in the gear position sensor 77.

Even though the gear position detected by the gear position sensor 77 is included in the low-speed gear position class and is different from the estimated gear position, the low-speed gear position abnormality determination unit 97 does not determine that there is an abnormality in the gear position sensor 77 when the clutch sensor 17 detects the cut-off state or the half clutch state. The low-speed gear position abnormality determination unit 97 determines that there is an abnormality in the gear position sensor 77 when the gear position detected by the gear position sensor 77 is included in the low-speed gear position class, the detected gear position is different from the estimated gear position, and the clutch sensor 17 detects the connection state. To be more specific, the low-speed gear position abnormality determination unit 97 measures a duration of a state in which the gear position detected by the gear position sensor 77 is included in the low-speed gear position class, the detected gear position is different from the estimated gear position, and the clutch sensor 17 detects the connection state. When the measured duration is equal to or longer than a predetermined duration, the low-speed gear position abnormality determination unit 97 determines that there is an abnormality in the gear position sensor 77.

The low-speed gear position abnormality determination unit 97 basically performs abnormality determination in the gear position sensor 77 once during a period from the start to the stop of the engine unit 11. Depending on the state of the motorcycle 1, abnormality determination in the gear position sensor 77 may not be performed at all during the period from the start to the stop of the engine unit 11. The low-speed gear position abnormality determination unit 97 may perform abnormality determination in the gear position sensor 77 more than once during the period from the start to the stop of the engine unit 11.

Figure 10:
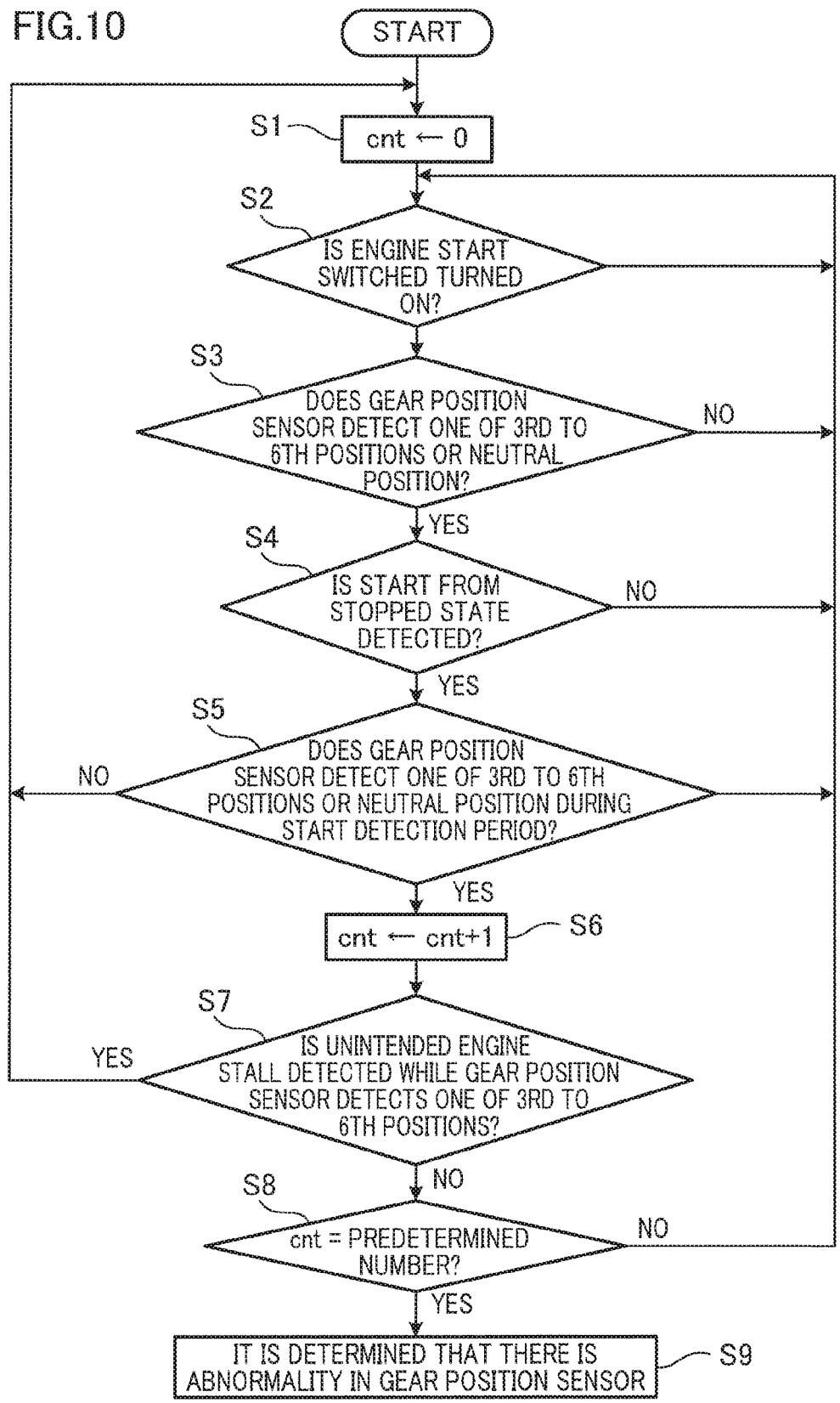
FIG. 10 is a flowchart showing an example of abnormality detection by a gear position sensor abnormality detector.
Figure 11:
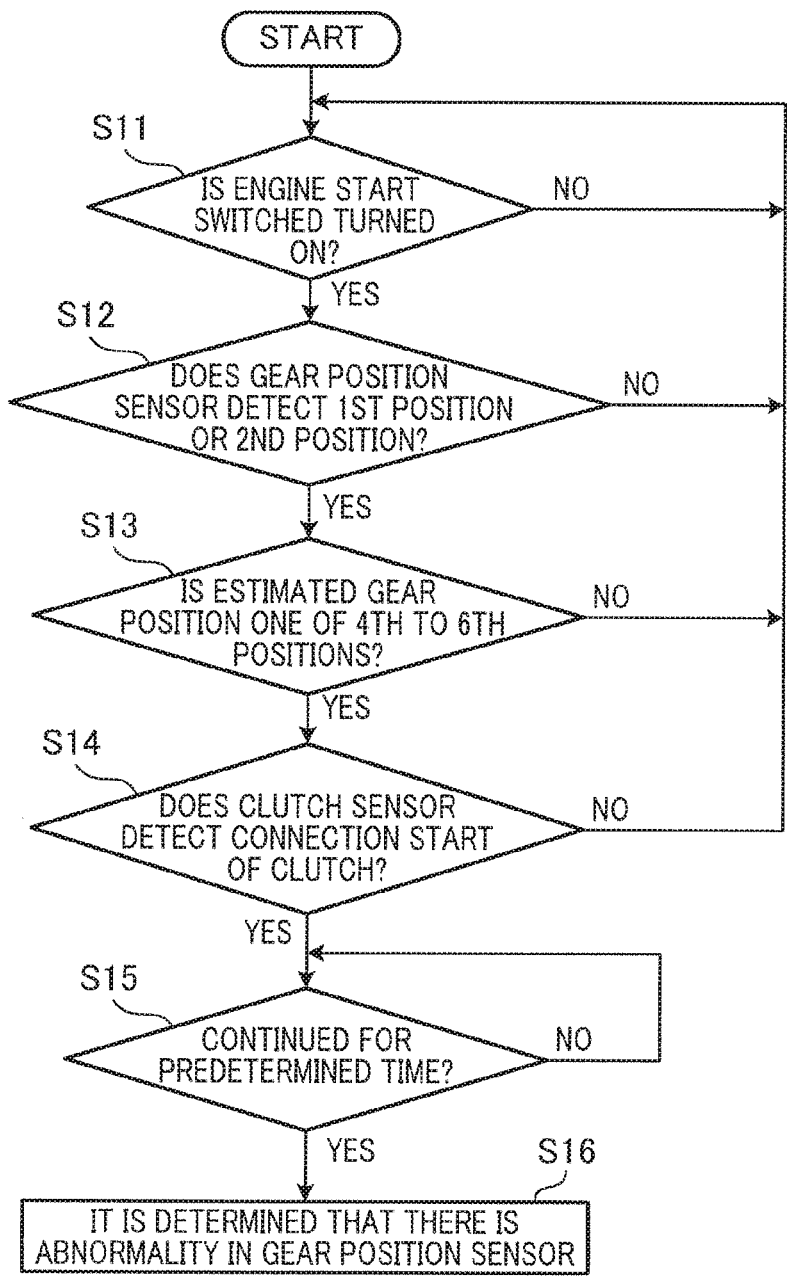
FIG. 11 is a flowchart showing an example of abnormality detection by the gear position sensor abnormality detector.

The following will describe an example of abnormality detection in the gear position sensor 77 with reference to flowcharts in FIG. 10 and FIG. 11.

The begin with, an example of abnormality detection by the high-speed gear position abnormality determination unit 96 will be described with reference to the flowchart shown in FIG. 10. The count is zero in an initial state (step S1). The high-speed gear position abnormality determination unit 96 determines whether the engine start switch 18 is in the on-state (step S2). When the engine start switch 18 is in the on-state (Yes in the step S2), the high-speed gear position abnormality determination unit 96 determines whether the gear position sensor 77 detects one of the gear positions in the high-speed gear position class or the neutral position (step S3). When the gear position sensor 77 detects one of the gear positions in the high-speed gear position class or the neutral position (Yes in the step S3), the high-speed gear position abnormality determination unit 96 determines whether the rotation speed of the wheel 2 detected by the wheel speed sensor 16 has been changed from zero to a predetermined speed. In short, whether the motorcycle 1 has been shifted from the stopped state to the running state is determined (step S4). When the rotation speed of the wheel 2 detected by the wheel speed sensor 16 has been changed from zero to the predetermined speed (Yes in the step S4), the high-speed gear position abnormality determination unit 96 determines whether the gear position sensor 77 has detected one of the gear positions in the high-speed gear position class or the neutral position during the start detection period (step S5). When the gear position sensor 77 has detected one of the gear positions in the high-speed gear position class or the neutral position during the start detection period (Yes in the step S5), the count is incremented by one (step S6). Thereafter, the high-speed gear position abnormality determination unit 96 determines whether an unintended engine stall has occurred while the gear position sensor 77 detects one of the gear positions in the high-speed gear position class (step S7). Whether the unintended engine stall has occurred is determined by the above-described determination method. When an unintended engine stall is detected while the gear position sensor 77 detects one of the gear positions in the high-speed gear position class (Yes in the step S7), the count is reset to zero (step S1). When an unintended engine stall is not detected while the gear position sensor 77 detects one of the gear positions in the high-speed gear position class (No in the step S7), the high-speed gear position abnormality determination unit 96 determines whether the count has reached a predetermined number (step S8). When the count has reached the predetermined number (Yes in the step S8), the high-speed gear position abnormality determination unit 96 determines that there is an abnormality in the gear position sensor 77 (step S9). When the count has not reached the predetermined number (No in the step S8), the process goes back to the step S3. When the gear position sensor 77 detects one of the gear positions in the low-speed gear position class during the start detection period (No in the step S5), the count is reset to zero (step S1). The step S3 may be omitted.

Subsequent to the above, an example of abnormality detection by the low-speed gear position abnormality determination unit 97 will be described with reference to the flowchart shown in FIG. 11. The low-speed gear position abnormality determination unit 97 determines whether the engine start switch 18 is in the on-state (step S11). When the engine start switch 18 is in the on-state (Yes in the step S11), the low-speed gear position abnormality determination unit 97 determines whether the gear position sensor 77 detects one of the gear positions in the low-speed gear position class (step S12). When the gear position sensor 77 detects one of the gear positions in the low-speed gear position class (Yes in the step S12), the low-speed gear position abnormality determination unit 97 determines whether the estimated gear position is one of the 4th position to the 6th position (step S13). In other words, the low-speed gear position abnormality determination unit 97 determines whether the estimated gear position is a gear position with a lower gear ratio than the gear position with the highest gear ratio in the high-speed gear position class. When the estimated gear position is one of the 4th position to the 6th position (Yes in the step S13), the low-speed gear position abnormality determination unit 97 determines whether the clutch sensor 17 has detected the connection state of the clutch 81 (step S14). When the clutch sensor 17 has detected the connection state of the clutch 81 (Yes in the step S14), the low-speed gear position abnormality determination unit 97 determines whether the state in which the results of the steps S11 to S14 are all Yes is continued for a predetermined time (step S15). When the state is continued for the predetermined time (Yes in the step S15), the low-speed gear position abnormality determination unit 97 determines that there is an abnormality in the gear position sensor 77 (step S16).

The motorcycle 1 of the specific example of the embodiment of the present teaching has been described hereinabove.

The motorcycle 1 of the specific example of the embodiment of the present teaching exerts the same effects as the motorcycle 1 of the embodiment shown in FIG. 1. The motorcycle 1 of the specific example of the embodiment of the present teaching further exerts the following effects.

For example, due to a mis-operation of the rider, the motorcycle 1 may start to run while the gear position of the transmission 80 is one of the gear positions in the high-speed gear position class. This may cause an unintended engine stall. The high-speed gear position abnormality determination unit 96 does not determine that there is an abnormality in the gear position sensor 77 when an unintended engine stall is detected while the gear position sensor 77 detects one of the gear positions in the high-speed gear position class after the start of the running of the motorcycle 1 is detected while the gear position sensor 77 detects one of the gear positions in the high-speed gear position class. This can prevent erroneous detection of an abnormality in the gear position sensor 77 when the gear position sensor 77 operates normally but the motorcycle 1 starts to run while the gear position of the transmission 80 is included in the high-speed gear position class. The capability of detecting an abnormality of the gear position sensor 77 by the ECU 90 can be therefore further improved.

The high-speed gear position abnormality determination unit 96 counts the number of times of detection of the shift of the motorcycle 1 from the stopped state to the running state while the gear position sensor 77 detects one of the gear positions in the high-speed gear position class. The high-speed gear position abnormality determination unit 96 determines that there is an abnormality in the gear position sensor 77 when the count reaches a predetermined number which is two or more. On this account, the accuracy of the abnormality detection by the high-speed gear position abnormality determination unit 96 can be improved as compared to a case where it is determined that there is an abnormality in the gear position sensor 77 when the shift of the motorcycle 1 from the stopped state to the running state is detected only once while the gear position sensor 77 detects one of the gear positions in the high-speed gear position class. The capability of detecting an abnormality of the gear position sensor 77 by the ECU 90 can be further improved.

The high-speed gear position abnormality determination unit 96 resets the count when an unintended engine stall is detected while the gear position sensor 77 detects one of the gear positions in the high-speed gear position class after the shift of the motorcycle 1 from the stopped state to the running state is detected while the gear position sensor 77 detects one of the gear positions in the high-speed gear position class. This can prevent erroneous detection of an abnormality in the gear position sensor 77 when the gear position sensor 77 operates normally but the motorcycle 1 starts to run while the gear position of the transmission 80 is included in the high-speed gear position class. An unintended engine stall does not always occur when the motorcycle 1 starts to run while the gear position of the transmission 80 is included in the high-speed gear position class. The high-speed gear position abnormality determination unit 96 counts the number of times of detection of the shift of the motorcycle 1 from the stopped state to the running state while the gear position sensor 77 detects one of the gear positions in the high-speed gear position class. The high-speed gear position abnormality determination unit 96 determines that there is an abnormality in the gear position sensor 77 when the count reaches a predetermined number which is two or more. For this reason, it is not determined that there is an abnormality in the gear position sensor 77 when an unintended engine stall occurs in at least one of plural successive starts of the running of the motorcycle 1 performed while the gear position of the transmission 80 is included in the high-speed gear position class. This can restrain an erroneous detection of an abnormality in the gear position sensor 77, and can improve the accuracy of the abnormality detection. The capability of detecting an abnormality of the gear position sensor 77 by the ECU 90 can be therefore further improved.

The motorcycle 1 may be successfully started to run even when the gear position of the transmission 80 is included in the high-speed gear position class, depending on the state of the motorcycle 1, the ambient situation, or the range of the gear ratios in the high-speed gear position class. To put it differently, the gear position sensor 77 may operate normally even when the start of the running of the motorcycle 1 is detected while the gear position sensor 77 detects one of the gear positions in the high-speed gear position class. However, it is actually rare that all of the plural successive starts of the running of the vehicle are performed while the gear position of the transmission 80 is included in the high-speed gear position class. The high-speed gear position abnormality determination unit 96 resets the count when the start of the running of the motorcycle 1 is detected based on a signal from the wheel speed sensor 16 while the gear position sensor 77 detects one of the gear positions in the low-speed gear position class. On this account, it is not determined that the gear position sensor 77 has an abnormality if, during plural successive starts of the running of the motorcycle 1, the gear position sensor 77 detects one of the gear positions in the high-speed gear position class in one start but the gear position sensor 77 detects one of the gear positions in the low-speed gear position class in another start. This can restrain erroneous detection of an abnormality in the gear position sensor 77, and can improve the accuracy of the abnormality detection. The capability of detecting an abnormality of the gear position sensor 77 by the ECU 90 can be therefore further improved.

The motorcycle 1 cannot start to run when the transmission 80 is in the neutral position. When the start of the running of the motorcycle 1 is detected based on a signal from the wheel speed sensor 16 while the gear position sensor 77 detects the neutral position, the gear position sensor 77 is likely to have an abnormality. The high-speed gear position abnormality determination unit 96 determines that there is an abnormality in the gear position sensor 77 when the start of the running of the motorcycle 1 is detected based on a signal from the wheel speed sensor 16 while the gear position sensor 77 detects the neutral position. The gear position sensor abnormality detection unit 95 of the ECU 90 is able to detect an abnormality in the gear position sensor 77 not only when the gear position sensor 77 detects one of the gear positions but also when the gear position sensor 77 detects the neutral position. The capability of detecting an abnormality of the gear position sensor 77 by the ECU 90 can be therefore further improved.

As described above, when the gear ratio of the gear position of the transmission 80 is high, the estimation of the gear position based on a signal of the crankshaft sensor 71 and a signal of the wheel speed sensor 16 is highly accurate. However, even when the gear ratio of the gear position of the transmission 80 is high, the estimated gear position may be different from the actual gear position if the diameter of the wheel driving sprocket 84 has been significantly changed. However, there is a limit to the change in diameter of the wheel driving sprocket 84. Therefore, even when the estimated gear position is different from the actual gear position, the estimated gear position is a gear position which is adjacent to the actual gear position in terms of the order of the gear ratios. It seems highly unlikely that the gear ratio of the estimated gear position is different from the gear ratio of the actual gear position by two or more stages in terms of the order of the gear ratios. The low-speed gear position abnormality determination unit 97 does not determine that there is an abnormality in the gear position sensor 77 when the gear position detected by the gear position sensor 77 is identical with the gear position estimated by the gear position estimation unit 94 or the detected gear position is adjacent to the estimated gear position in terms of the order of the gear ratios. The low-speed gear position abnormality determination unit 97 determines that there is an abnormality in the gear position sensor 77 when the gear position sensor 77 detects one of the gear positions in the low-speed gear position class and there is one or more gear position between the gear position detected by the gear position sensor 77 and the gear position estimated by the gear position estimation unit 94 in terms of the order of the gear ratios. This can prevent erroneous detection of an abnormality in the gear position sensor 77 when the gear position sensor 77 operates normally but the riding style of the motorcycle 1 is changed by changing the diameter of the wheel driving sprocket 84. It is therefore possible to highly accurately detect an abnormality in the gear position sensor 77 while preventing erroneous detection of an abnormality in the gear position sensor 77 after the riding style of the motorcycle 1 is changed. To put it differently, the capability of detecting an abnormality of the gear position sensor 77 can be further improved while the versatility of abnormality detection in the gear position sensor 77 by the ECU 90 is further improved.

The low-speed gear position abnormality determination unit 97 does not determine that there is an abnormality in the gear position sensor 77 when the gear position estimated by the gear position estimation unit 94 has the highest gear ratio in the high-speed gear position class or is a gear position having a gear ratio higher than the highest gear ratio in the high-speed gear position class. The low-speed gear position abnormality determination unit 97 determines that there is an abnormality in the gear position sensor 77 when the gear position sensor 77 detects one of the gear positions in the low-speed gear position class and the gear position estimated by the gear position estimation unit 94 is a gear position with a lower gear ratio than the gear position with the highest gear ratio in the high-speed gear position class. It is therefore possible to highly accurately detect an abnormality in the gear position sensor 77 while preventing erroneous detection of an abnormality in the gear position sensor 77 even when the riding style of the motorcycle 1 is changed by changing the diameter of the wheel driving sprocket 84. To put it differently, the capability of detecting an abnormality of the gear position sensor 77 can be further improved while the versatility of abnormality detection in the gear position sensor 77 by the ECU 90 is further improved. [0149] When the clutch 81 is in the cut-off state or the half clutch state, the gear position estimation unit 94 cannot estimate the correct gear position. For this reason, when the clutch 81 is in the cut-off state or the half clutch state, the gear position estimated by the gear position estimation unit 94 may be different from the gear position detected by the gear position sensor 77. Even though the gear position detected by the gear position sensor 77 is included in the low-speed gear position class and is different from the gear position estimated by the gear position estimation unit 94, the low-speed gear position abnormality determination unit 97 does not detect an abnormality in the gear position sensor 77 when the clutch sensor 17 detects the cut-off state or the half clutch state of the clutch 81. It is therefore possible to prevent erroneous detection of an abnormality in the gear position sensor 77 when the gear position sensor 77 operates normally and the clutch 81 is either in the cut-off state or in the half clutch state. The capability of detecting an abnormality of the gear position sensor 77 by the ECU 90 can be further improved.

When the gear position of the transmission 80 is changed while the motorcycle 1 is running, the transmission of the power from the crankshaft 25 to the input shaft 82 of the transmission 80 is temporarily cut off by the clutch 81. When the transmission of the power from the crankshaft 25 to the transmission 80 is cut off, the gear position estimation unit 94 cannot estimate the correct gear position. The time during which the clutch 81 cuts off the transmission of the power, however, is short. The low-speed gear position abnormality determination unit 97 measures a duration during which the gear position detected by the gear position sensor 77 is included in the low-speed gear position class and is different from the gear position estimated by the gear position estimation unit 94. When the measured duration is equal to or longer than a predetermined duration, the low-speed gear position abnormality determination unit 97 determines that there is an abnormality in the gear position sensor 77. It is therefore possible to prevent erroneous detection of an abnormality in the gear position sensor 77 even when the gear position detected by the gear position sensor 77 is temporarily different from the gear position estimated by the gear position estimation unit 94 on account of the cutoff of the power transmission from the crankshaft 25 to the transmission 80 by the clutch 81. The capability of detecting an abnormality of the gear position sensor 77 by the ECU 90 can be therefore further improved.

Modifications of Embodiment of Present Teaching

Preferred embodiments of the present teaching have been described above. However, the present teaching is not limited to the above-described embodiment and the specific example of the embodiment, and various changes can be made within the scope of the claims. Components having the same structure as those described above will be given the same reference numerals, and the description thereof will be omitted, if appropriate. Below-described modifications may be used in combination as needed.

<Modifications Regarding Rotation Speed Sensor>

Figure 12:
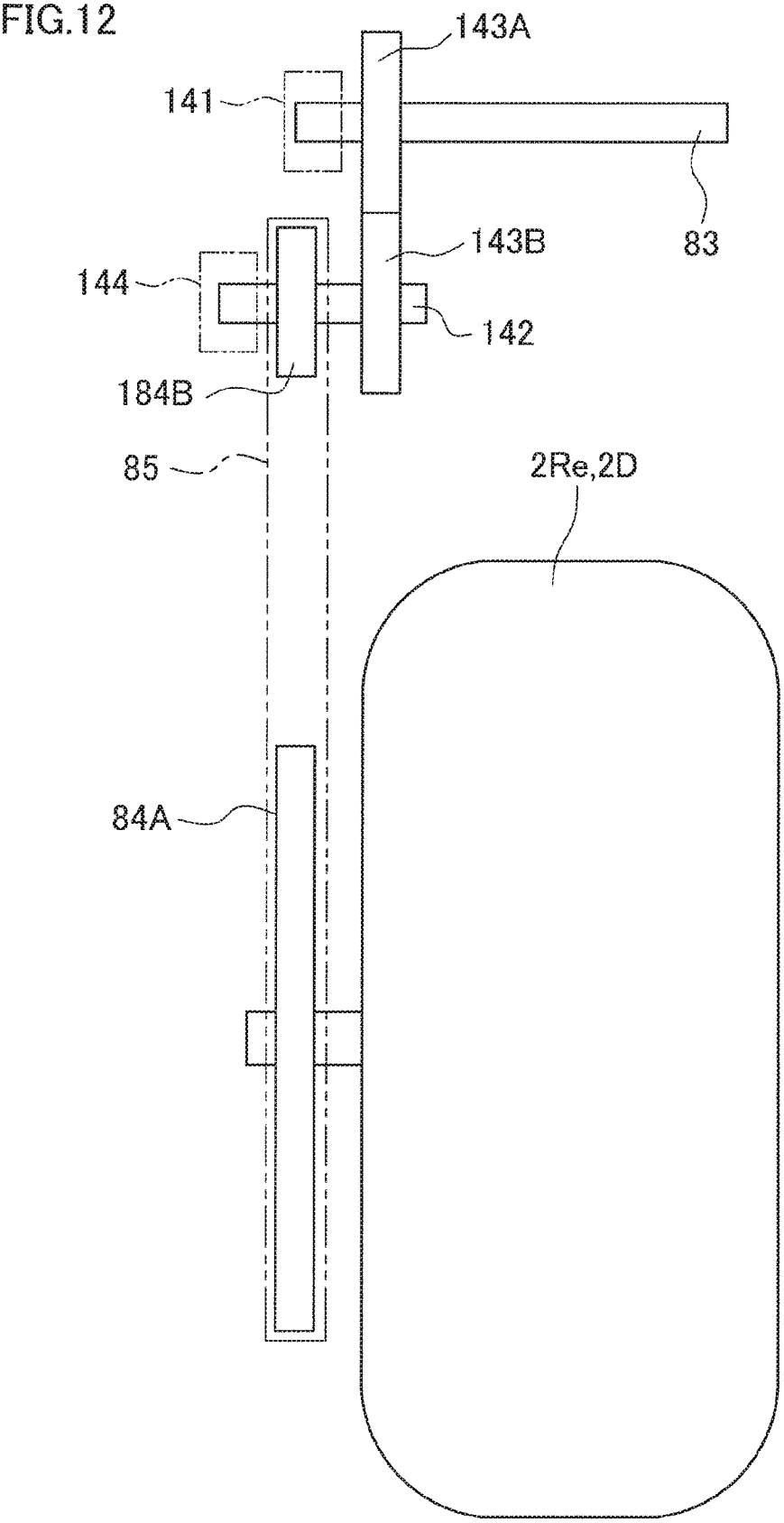
FIG. 12 is a schematic view showing part of a motorcycle of a modification.

In the specific example of the embodiment above, the motorcycle 1 includes the wheel speed sensor 16 as a rotation speed sensor. Alternatively, the straddled vehicle of the present teaching may include a rotation speed sensor which is configured to detect the rotation speed of an output shaft of a transmission. FIG. 12 shows an example of this arrangement. An output shaft speed sensor 141 shown in FIG. 12 is configured to detect the rotation speed of the output shaft 83. Alternatively, when the straddled vehicle of the present teaching includes an intermediate power transmission shaft by which power of an output shaft is transmitted to a driving wheel, the straddled vehicle may include a rotation speed sensor which is configured to detect the rotation speed of the intermediate power transmission shaft. FIG. 12 shows an example of this arrangement. An intermediate power transmission shaft speed sensor 144 shown in FIG. 12 is configured to detect the rotation speed of an intermediate power transmission shaft 142 by which power of the output shaft 83 is transmitted to the driving wheel 2D (rear wheel 2Re).

In FIG. 12, two gears 143A and 143B which are engaged with each other are employed as an arrangement by which power is transmitted from the output shaft 83 to the intermediate power transmission shaft 142. The gear 143A on the output shaft 83 and the gear 143B on the intermediate power transmission shaft 142 are engaged with each other. Two sprockets and a chain may be used as an arrangement by which power is transmitted from an output shaft to an intermediate power transmission shaft. That is to say, a chain may be wound onto sprockets which are provided on the output shaft and the intermediate power transmission shaft, respectively. Two pulleys and a belt may be used as an arrangement by which power is transmitted from an output shaft to an intermediate power transmission shaft. That is to say, a belt may be wound onto pulleys which are provided on the output shaft and the intermediate power transmission shaft, respectively. In FIG. 12, two sprockets 184B and 84A and a chain 85 are used as an arrangement by which power is transmitted from the intermediate power transmission shaft 142 to the driving wheel 2D. The chain 85 is wound onto a drive sprocket 184B provided on the intermediate power transmission shaft 142 and the driven sprocket 84A provided on the axle shaft of the rear wheel 2Re. Two pulleys and a belt may be used as an arrangement by which power is transmitted from an intermediate power transmission shaft to a driving wheel 2D. That is to say, a belt may be wound onto pulleys which are provided on the intermediate power transmission shaft and the driving wheel, respectively.

The number of rotation speed sensors provided in the straddled vehicle of the present teaching may be one or more than one. When the number of rotation speed sensors is two, the two rotation speed sensors may be sensors detecting the rotation speed of the wheel and the rotation speed of the output shaft of the transmission. When the number of rotation speed sensors is two, the two rotation speed sensors may be sensors detecting the rotation speed of the wheel and the rotation speed of the intermediate power transmission shaft. When the number of rotation speed sensors is two, the two rotation speed sensors may be sensors detecting the rotation speed of the output shaft and the rotation speed of the intermediate power transmission shaft. When the number of rotation speed sensors is two, the two rotation speed sensors may be sensors detecting the rotation speeds of the two wheels.

When the number of rotation speed sensors provided in the straddled vehicle of the present teaching is more than one, the rotation speed sensor used for estimating the gear position and the rotation speed sensor used for detecting the start of the running of the vehicle may be same or different. The gear position sensor abnormality detector of the present teaching may use, for estimation of the gear position and detection of the start of the running of the vehicle, the rotation speed sensor for detecting the rotation speed of the wheel, the rotation speed sensor for detecting the rotation speed of the output shaft of the transmission, or the rotation speed sensor for detecting the rotation speed of the intermediate power transmission shaft.

In the gear position sensor abnormality detector of the present teaching, the rotation speed sensor for detecting the rotation speed of the wheel may be used for estimation of the gear position and the rotation speed sensor for the output shaft of the transmission may be used for detection of the start of the running of the vehicle. In the gear position sensor abnormality detector of the present teaching, the rotation speed sensor for detecting the rotation speed of the wheel may be used for estimation of the gear position and the rotation speed sensor for the intermediate power transmission shaft may be used for detection of the start of the running of the vehicle.

In the gear position sensor abnormality detector of the present teaching, the rotation speed sensor for detecting the rotation speed of the output shaft of the transmission may be used for estimation of the gear position and the rotation speed sensor for the wheel may be used for detection of the start of the running of the vehicle. In the gear position sensor abnormality detector of the present teaching, the rotation speed sensor for detecting the rotation speed of the output shaft of the transmission may be used for estimation of the gear position and the rotation speed sensor for the intermediate power transmission shaft may be used for detection of the start of the running of the vehicle. In the gear position sensor abnormality detector of the present teaching, the rotation speed sensor for detecting the rotation speed of the intermediate power transmission shaft may be used for estimation of the gear position and the rotation speed sensor for the wheel may be used for detection of the start of the running of the vehicle. In the gear position sensor abnormality detector of the present teaching, the rotation speed sensor for detecting the rotation speed of the intermediate power transmission shaft may be used for estimation of the gear position and the rotation speed sensor for the output shaft of the transmission may be used for detection of the start of the running of the vehicle. The rotation speed sensor used for estimation of the gear position is preferably a sensor which is configured to detect the rotation speed of the output shaft of the transmission or the rotation speed of the intermediate power transmission shaft. With this arrangement, the accuracy of the estimation of the gear position is improved as compared to cases where the rotation speed sensor for detecting the rotation speed of the wheel is used for estimation of the gear position.

<Modifications Regarding Abnormality Detection in Gear Position Sensor>

In the specific example of the embodiment above, the gear position estimation unit 94 estimates the gear position by using the gear position estimation map shown in FIG. 7 and based on a signal from the crankshaft sensor 71 and a signal from the wheel speed sensor 16. In other words, the gear position is sampled from the gear position estimation map. Alternatively, the gear position estimation unit 94 may estimate the gear position by using a calculation formula and based on a signal from the crankshaft sensor 71 and a signal from the wheel speed sensor 16. To be more specific, a gear ratio is calculated by using a calculation formula based on the rotation speed of the crankshaft 25 detected by the crankshaft sensor 71 and the rotation speed of the wheel 2 detected by the wheel speed sensor 16. The gear position may be estimated from the calculated gear ratio.

The gear position estimation unit 94 may estimate the gear position based on the vehicle speed calculated by the vehicle speed calculation unit 91 and the rotation speed of the crankshaft 25 detected by the crankshaft sensor 71. To put it differently, in the present teaching, estimation of the gear position of the transmission based on a signal from the crankshaft sensor and a signal from the rotation speed sensor encompasses estimation of the gear position of the transmission based on the vehicle speed figured out from a signal of the rotation speed sensor detecting the rotation speed of the wheel and a signal of the crankshaft sensor.

The diameter of a wheel may be changed by replacement of the tire of the wheel. The riding style is changed by changing the diameter of the wheel. The vehicle speed is changed when the diameter of the wheel is changed. On this account, the estimated gear position may be different from the actual gear position when the vehicle speed figured out based on a signal from the rotation speed sensor detecting the rotation speed of the wheel and a signal from the crankshaft sensor are used for estimating the gear position. However, when the gear ratio of the gear position is high, the degree of change of the vehicle speed is low relative to a change in diameter of the wheel. In other words, when the gear ratio of the gear position is high, the estimation of the gear position based on the vehicle speed and the rotational speed of the crankshaft is highly accurate. For this reason, when the gear position detected by the gear position sensor is included in the low-speed gear position class and is different from the estimated gear position, the gear position sensor is likely to have an abnormality. On this account, the gear position sensor abnormality detector is able to highly accurately detect an abnormality of the gear position when the gear position detected by the gear position sensor belongs to the low-speed gear position class.

When the straddled vehicle starts to run, the gear position of the transmission is typically a gear position having a high gear ratio. On this account, when the start of the running of the straddled vehicle 1 is detected based on a signal of the rotation speed sensor detecting the rotational speed of the wheel while the gear position sensor detects one of the gear positions in the high-speed gear position class, the gear position sensor is likely to have an abnormality. On this account, the gear position sensor abnormality detector is able to highly accurately detect an abnormality of the gear position when the gear position detected by the gear position sensor belongs to the high-speed gear position class.

The low-speed gear position abnormality determination unit 97 may directly compare the gear position detected by the gear position sensor 77 with the estimated gear position. To be more specific, for example, the low-speed gear position abnormality determination unit 97 determines that there is an abnormality in the gear position sensor 77 when the gear position sensor 77 detects one of the gear positions in the low-speed gear position class and there is one or more gear position between the gear position detected by the gear position sensor 77 and the estimated gear position in terms of the order of the gear ratios. The low-speed gear position abnormality determination unit 97 does not determine that there is an abnormality in the gear position sensor 77 when the gear position detected by the gear position sensor 77 is identical with the estimated gear position or the detected gear position is adjacent to the estimated gear position in terms of the order of the gear ratios.

In the present teaching, the number of the gear positions included in the high-speed gear position class may be one or more than one. The number of the gear positions included in the low-speed gear position class may be one or more than one.

When the number of the gear positions included in the low-speed gear position class is one, the way of abnormality detection in the gear position sensor by the gear position sensor abnormality detector is different from the above-described way in the specific example of the embodiment above. The gear position sensor abnormality detector determines that there is an abnormality in the gear position sensor when the gear position detected by the gear position sensor is included in the low-speed gear position class and is different from the estimated gear position. Whether there is one or more gear position between the gear position detected by the gear position sensor and the estimated gear position in terms of the order of the gear ratios is not a condition of the determination. The gear position sensor abnormality detector may employ this detection way when the number of the gear positions in the low-speed gear position class is plural, too.

In the specific example of the embodiment above, the high-speed gear position abnormality determination unit 96 determines that the motorcycle 1 has shifted from the stopped state to the running state when the rotation speed of the wheel 2 detected by the wheel speed sensor 16 is changed from zero to a predetermined speed. In this regard, in the present teaching, detection of shift of the straddled vehicle from the stopped state to the running state based on the rotation speed sensor detecting the rotation speed of the wheel may be done in a different way.

For example, it may be determined that the shift of the motorcycle from the stopped state to the running state has occurred, when it is detected that the rotation speed detected by the rotation speed sensor is changed from zero to a predetermined speed and the engine unit is in operation. Whether the engine unit is in operation may be determined based on the state of the engine start switch by which the operation of the engine unit is started. Alternatively, whether the engine unit is in operation may be determined based on whether the rotational speed of the crankshaft is equal to or higher than a predetermined rotation speed.

Furthermore, for example, it may be determined that the motorcycle has shifted from the stopped state to the running state, when it is detected that the engine unit is in operation and a state in which the rotational speed detected by the rotation speed sensor is equal to or higher than zero and is equal to or lower than a predetermined speed continues for at least a predetermined time. When the rotation speed sensor may be a sensor configured to detect the rotation speed of a wheel, the predetermined speed may be about 3 km/h, for example. The predetermined time is about 10 seconds, for example.

In the specific example of the embodiment above, the high-speed gear position abnormality determination unit 96 counts the number of times of detection of the shift of the motorcycle 1 from the stopped state to the running state while the gear position sensor 77 detects one of the gear positions in the high-speed gear position class or the neutral position. The high-speed gear position abnormality determination unit 96 determines that there is an abnormality in the gear position sensor 77 when the count reaches a predetermined number which is two or more. The gear position sensor abnormality detector of the present teaching, however, may not perform this counting. The gear position sensor abnormality detector of the present teaching may determine that there is an abnormality in the gear position sensor when shift of the straddled vehicle from the stopped state to the running state is detected once while the gear position sensor detects one of the gear positions in the high-speed gear position class or the neutral position.

In the specific example of the embodiment above, the high-speed gear position abnormality determination unit 96 resets the count when either the first reset condition or the second reset condition is satisfied. Alternatively, the condition with which the count is reset to zero may be only one of the above-described two reset conditions. Alternatively, the count may be reset to zero based on a condition which is different from the above-described two reset conditions. The count may be reset only when the count reaches a predetermined number.

In the specific example of the embodiment above, the low-speed gear position abnormality determination unit 97 measures a duration of a state in which the gear position detected by the gear position sensor 77 is included in the low-speed gear position class and is different from the estimated gear position. When the measured duration is equal to or longer than a predetermined duration, the low-speed gear position abnormality determination unit 97 determines that there is an abnormality in the gear position sensor 77. The gear position sensor abnormality detector of the present teaching, however, may not measure this duration. The gear position sensor abnormality detector of the present teaching may determine that there is an abnormality in the gear position sensor when the gear position detected by the gear position sensor is included in the low-speed gear position class and is different from the estimated gear position, irrespective of the duration.

The gear position sensor abnormality detector of the present teaching may count the number of times of detection that the gear position detected by the gear position sensor is included in the low-speed gear position class and is different from the estimated gear position. The gear position sensor abnormality detector may determine that there is an abnormality in the gear position sensor when the count reaches a predetermined number which is more than one. This may ensure prevention of erroneous detection of an abnormality.

When the gear position detected by the gear position sensor is included in the high-speed gear position class, the gear position sensor abnormality detector of the present teaching may change a way of abnormality detection in accordance with the detected gear position. For example, the count with which an abnormality in the gear position sensor is determined may be changed in accordance with the gear position detected by the gear position sensor. To be more specific, for example, when the gear position detected by the gear position sensor is the gear position having the highest gear ratio in the high-speed gear position class, it is determined that there is an abnormality in the gear position sensor when the count reaches a number which is more than one. Meanwhile, when the gear position detected by the gear position sensor is another gear position in the high-speed gear position class, it is determined that there is an abnormality in the gear position sensor when the count is 1. Depending on the driving condition, the vehicle may be able to successfully start to run without an engine stall even if the gear position is included in the high-speed gear position class. However, with a gear position having a low gear ratio, it is impossible to start the running of the vehicle without an engine stall. On this account, when the gear position detected by the gear position sensor is included in the high-speed gear position class, by changing a way of abnormality detection in accordance with the gear position, it is possible to swiftly detect an abnormality without erroneous detection. However, from the perspective of simplification of arithmetic processing, the way of abnormality detection is preferably not changed in accordance with the gear position when the gear position detected by the gear position sensor is included in the high-speed gear position class.

When the gear position detected by the gear position sensor is included in the low-speed gear position class, the gear position sensor abnormality detector of the present teaching may change the way of abnormality detection in accordance with the detected gear position. For example, the gear position sensor abnormality detector determines that there is an abnormality in the gear position sensor when the gear position detected by the gear position sensor is the 1st position and the gear ratio of the detected gear position is different from the gear ratio of the estimated gear position by one or more stages in terms of the order of the gear ratios. Meanwhile, when the gear position detected by the gear position sensor 77 is a gear position which is not the 1st position and is a gear position in the low-speed gear position class and there is one or more gear position between detected gear position and the estimated gear position in terms of the order of the gear ratios, it is determined that the gear position sensor has an abnormality. When the gear position detected by the gear position sensor is not the 1st position and is a gear position in the low-speed gear position class and the detected gear position is adjacent to the estimated gear position in terms of the order of the gear ratios, it is not determined that the gear position sensor has an abnormality. The higher the gear ratio of the gear position of the transmission is, the lower the degree of change of the rotation speed of the wheel is relative to a change in diameter of the wheel driving sprocket. On this account, the higher the gear ratio of the gear position of the transmission is, the higher the accuracy of the estimation of the gear position is. On this account, when the gear position detected by the gear position sensor is included in the low-speed gear position class, by changing the way of abnormality detection in accordance with the gear position, it is possible to swiftly detect an abnormality without erroneous detection. However, from the perspective of simplification of arithmetic processing, the way of abnormality detection is preferably not changed in accordance with the gear position when the gear position detected by the gear position sensor is included in the low-speed gear position class.

In the specific example of the embodiment above, when the gear position sensor 77 detects the neutral position, the high-speed gear position abnormality determination unit 96 determines whether there is an abnormality in the gear position sensor 77 by a way substantially identical with the way when the gear position sensor 77 detects a gear position in the high-speed gear position class. Alternatively, in the present teaching, the way of abnormality detection in the gear position sensor when the gear position sensor detects the neutral position may be different from the way which is used when the gear position sensor detects a gear position in the high-speed gear position class. For example, the gear position sensor abnormality detector may determine that there is an abnormality in the gear position sensor when the gear position sensor detects the neutral position and a neutral sensor does not detect the neutral position. The neutral sensor is a sensor which is configured to detect whether the transmission is in the neutral position and is independent from the gear position sensor. When the engine unit 11 of the specific example of the embodiment above includes the neutral sensor, the neutral sensor detects whether the transmission 80 is in the neutral position based on, for example, the rotational position of the shift cam 88.

The straddled vehicle of the present teaching may include a sensor abnormality detector which is configured to detect an abnormality in a sensor which is different from the gear position sensor. This sensor abnormality detector may be different from the gear position sensor abnormality detector of the present teaching. The sensor abnormality detector preferably functions as the gear position sensor abnormality detector of the present teaching, too.

The sensor abnormality detector is preferably arranged or programmed to detect an abnormality in the rotation speed sensor and the crankshaft sensor.

When an abnormality is detected in the rotation speed sensor used for detecting the start of the running of the vehicle, the gear position sensor abnormality detector preferably does not perform abnormality determination which is performed when the gear position sensor detects a gear position included in the high-speed gear position class. Alternatively, when it is determined that there is an abnormality, the determination is preferably withdrawn.

When an abnormality is detected in the rotation speed sensor or the crankshaft sensor used for estimating the gear position, the gear position sensor abnormality detector preferably does not perform abnormality determination which is performed when the gear position sensor detects a gear position included in the low-speed gear position class.

Alternatively, when it is determined that there is an abnormality, the determination is preferably withdrawn.

When a sensor different from the rotation speed sensor and the crankshaft sensor is used for abnormality detection in the gear position sensor, the sensor abnormality detector is preferably arranged or programmed to detect an abnormality in that sensor.

The gear position sensor abnormality detector of the present teaching may execute the abnormality determination of the specific example of the embodiment above after the abnormality determination recited in Patent Literature 1. With this arrangement, abnormalities such as short-circuit and disconnection in the gear position sensor can be found by the abnormality determination of Patent Literature 1.

In the specific example of the embodiment of the present teaching, the ECU 90 includes the high-speed gear position abnormality determination unit 96 and the low-speed gear position abnormality determination unit 97 as functional units. In other words, a different functional unit executes abnormality detection in the gear position sensor 77 based on whether the gear position detected by the gear position sensor 77 is included in the high-speed gear position class or in the low-speed gear position class. Alternatively, in the present teaching, only one inseparable functional unit may be provided for executing abnormality detection in the gear position sensor.

<Modifications Regarding Arrangement of Gear Position Sensor Abnormality Detector In the specific example of the embodiment above, the ECU 90 is equivalent to the gear position sensor abnormality detector of the present teaching. Alternatively, the motorcycle 1 may include a gear position sensor abnormality detector in addition to the ECU 90.

The number of processors included in the gear position sensor abnormality detector of the present teaching may be one or more than one.

<Modifications Regarding Transmission>

The number of gear positions of the transmission 80 of the specific example of the embodiment above is six. The number of gear positions included in the transmission of the present teaching is not limited to six, and may be any number which is more than one.

The transmission 80 of the specific example of the embodiment above is a sequential shift transmission. The transmission of the present teaching may not be a sequential shift transmission. The transmission of the present teaching is preferably a sequential shift transmission.

The transmission 80 of the specific example of the embodiment above is a constant-mesh transmission. A gear on the input shaft is always engaged with a gear on the output shaft in a constant-mesh transmission. One of the engaged gears is provided on the shaft to be able to idle. Power is transmitted in such a way that a specific gear slides along the shaft and is engaged with another gear which neighbors the specific gear in the axial direction. The transmission of the present teaching may be a synchromesh transmission including a synchromesh mechanism. The transmission of the present teaching may be a non-synchro transmission not including a synchromesh mechanism. The synchromesh mechanism is a mechanism which causes gears neighboring each other in the axial direction and engaged with each other to be synchronized in speed. The transmission of the present teaching may be a selective sliding-gear transmission (sliding mesh transmission). In the selective sliding-gear transmission, a gear slides in the axial direction and is engaged with another gear. The transmission of the present teaching may include an auxiliary transmission.

The transmission 80 of the specific example of the embodiment is a manual transmission. The transmission of the present teaching may be a full-automatic transmission. The transmission may be a semi-automatic transmission. In the manual transmission, the gear is switched as the rider operates the clutch lever and the shift pedal. In the full-automatic transmission, a shift actuator is automatically driven in accordance with the vehicle speed, the engine rotation speed, etc., so that the gear is switched. In the semi-automatic transmission, only clutch operation is automatically done, and the gear is switched as the rider operates the shift pedal. When the transmission of the present teaching is a sequential shift transmission, the transmission may be a manual transmission, a full-automatic transmission, or a semi-automatic transmission.

The clutch of the transmission of the present teaching may be a friction clutch. The clutch may be a hydraulic clutch. The clutch may be an electromagnetic clutch. The clutch may be a centrifugal clutch.

<Modifications Regarding Engine Unit>

In the specific example of the embodiment above, the crankcase 21 and the cylinder body 22 are different members. Alternatively, the crankcase 21 and the cylinder body 22 may be integrally molded. In the specific example of the embodiment above, the cylinder body 22, the cylinder head 23, and the head cover 24 are different members. Alternatively, two or three of the cylinder body, the cylinder head, and the head cover may be integrally molded.

The engine unit 11 of the specific example of the embodiment above is a water-cooled engine. Alternatively, the engine unit of the present teaching may be a natural air-cooled engine or a forced air-cooled engine. When the engine unit is a natural air-cooled engine or a forced air-cooled engine, an engine temperature sensor for detecting the temperature of the engine main body is provided.

The engine unit 11 of the specific example of the embodiment above is a four-stroke single-cycle engine. Alternatively, the engine unit of the present teaching may be a two-stroke single-cycle engine.

The engine unit 11 of the specific example of the embodiment above is a three-cylinder engine. The engine unit of the present teaching may be a multi-cylinder engine which is not a three-cylinder engine. The engine unit of the present teaching may be a single-cylinder engine. The engine unit of the present teaching is preferably a multi-cylinder engine. When the engine unit of the present teaching is a multi-cylinder engine, the engine unit preferably has an independent throttle body. In the engine unit with the independent throttle body, a throttle valve is provided for each combustion chamber.

The engine unit of the present teaching may be a supercharged engine with a supercharger. The supercharger is configured to compress air supplied to a combustion chamber. The supercharger may be a mechanical supercharger or an exhaust turbine supercharger (so-called turbo charger).

The engine unit of the present teaching may be a gasoline engine or a diesel engine. The engine unit of the present teaching may be a hydrogen rotary engine.

REFERENCE SIGNS LIST

1 motorcycle (straddled vehicle)
2 wheel
2F front wheel (wheel)

2Re rear wheel (wheel)
2D driving wheel
11 engine unit
16 wheel speed sensor (rotation speed sensor)
16F front wheel speed sensor
16Re rear wheel speed sensor
17 clutch sensor
21 crankcase member
21A crankshaft supporter
21B crankshaft-supporter-integrated transmission supporter
25 crankshaft
71 crankshaft sensor
77 gear position sensor
80 transmission
81 clutch
82 input shaft
83 output shaft
84A (84) driven sprocket (wheel driving sprocket)
84B (84), 184B drive sprocket (wheel driving sprocket)
90 ECU (gear position sensor abnormality detector)
94 gear position estimation unit
96 high-speed gear position abnormality determination unit
97 low-speed gear position abnormality determination unit
141 output shaft speed sensor (rotation speed sensor)
142 intermediate power transmission shaft
144 intermediate power transmission shaft speed sensor (rotation speed sensor)

What is claimed is:

1. A straddled vehicle comprising:
an engine unit including:
　(a) a crankshaft; and
　(b) a transmission which includes an input shaft to which power is transmitted from the crankshaft and an output shaft to which the power is transmitted from the input shaft, the transmission having selectable gear positions, and a gear ratio, which is a ratio of rotation speed of the input shaft to rotation speed of the output shaft, being different between the gear positions;
wheels which include at least one driving wheel to which the power is transmitted from the output shaft;
a crankshaft sensor which is configured to detect rotation speed of the crankshaft;
at least one rotation speed sensor which is configured to detect at least one of rotation speed of at least one of the wheels, the rotation speed of the output shaft, or rotation speed of an intermediate power transmission shaft configured to transmit the power of the output shaft to the at least one driving wheel;
a gear position sensor which is configured to detect a gear position of the transmission; and
a gear position sensor abnormality detector which is configured to detect an abnormality of the gear position sensor,
the engine unit further including, in addition to the crankshaft and the transmission:
　(c) a crankshaft supporter which supports the crankshaft; and
　(d) a crankshaft-supporter-integrated transmission supporter which supports the transmission, the gear position sensor being provided at the crankshaft-supporter-integrated transmission supporter, and at least part of the crankshaft-supporter-integrated transmission supporter being integrally molded with at least part of the crankshaft supporter,
the gear positions being classified into a high-speed gear position class including a gear position having a lowest gear ratio among the gear positions and a low-speed gear position class consisting of at least one gear position having a higher gear ratio than gear ratios of gear positions in the high-speed gear position class, and
the gear position sensor abnormality detector including at least one processor which is arranged or programmed:
　(A) to determine that there is an abnormality in the gear position sensor provided at the crankshaft-supporter-integrated transmission supporter, when detecting a shift of the straddled vehicle from a stopped state to a running state based on a signal from a first rotation speed sensor of the at least one rotation speed sensor, while a gear position detected by the gear position sensor provided at the crankshaft-supporter-integrated transmission supporter is included in the high-speed gear position class;
　(B) to estimate the gear position of the transmission based on a signal from the crankshaft sensor and a signal from a second rotation speed sensor of the at least one rotation speed sensor; and
　(C) to determine that there is an abnormality in the gear position sensor provided at the crankshaft-supporter-integrated transmission supporter, when a gear position detected by the gear position sensor provided at the crankshaft-supporter-integrated transmission supporter is included in the low-speed gear position class and is different from the estimated gear position.

2. The straddled vehicle according to claim 1, wherein the at least one processor of the gear position sensor abnormality detector is arranged or programmed not to determine that there is an abnormality in the gear position sensor provided at the crankshaft-supporter-integrated transmission supporter, when, after the shift of the straddled vehicle from the stopped state to the running state is detected based on the signal from the first rotation speed sensor while the gear position detected by the gear position sensor provided at the crankshaft-supporter-integrated transmission supporter is included in the high-speed gear position class, an unintended engine stall is detected while a gear position detected by the gear position sensor provided at the crankshaft-supporter-integrated transmission supporter is included in the high-speed gear position class.

3. The straddled vehicle according to claim 1, wherein the at least one processor of the gear position sensor abnormality detector is arranged or programmed to determine that there is an abnormality in the gear position sensor provided at the crankshaft-supporter-integrated transmission supporter, when a number of times of detection of the shift of the straddled vehicle from the stopped state to the running state is counted based on the signal from the first rotation speed sensor and the counted number reaches a predetermined number which is more than one, while the gear position detected by the gear position sensor provided at the crankshaft-supporter-integrated transmission supporter is included in the high-speed gear position class.

4. The straddled vehicle according to claim 3, wherein the at least one processor of the gear position sensor abnormality detector is arranged or programmed to reset the counted number when, after the shift of the straddled vehicle from the stopped state to the running state is detected based on the signal from the first rotation speed sensor while the gear position detected by the gear position sensor provided at the crankshaft-supporter-integrated transmission supporter is included in the high-speed gear position class, an unintended engine stall is detected while a gear position detected by the gear position sensor provided at the crankshaft-supporter-integrated transmission supporter is included in the high-speed gear position class.

5. The straddled vehicle according to claim 3, wherein
the at least one processor of the gear position sensor abnormality detector is arranged or programmed to reset the counted number when the shift of the straddled vehicle from the stopped state to the running state is detected based on the signal from the first rotation speed sensor while the gear position detected by the gear position sensor provided at the crankshaft-supporter-integrated transmission supporter is included in the low-speed gear position class.

6. The straddled vehicle according to claim 1, wherein
when the transmission is in none of the gear positions, the transmission is in a neutral position in which no power is transmitted from the input shaft to the output shaft, the gear position sensor is able to detect that the transmission is in the neutral position, and
the at least one processor of the gear position sensor abnormality detector is arranged or programmed to determine that there is an abnormality in the gear position sensor provided at the crankshaft-supporter-integrated transmission supporter, when the shift of the straddled vehicle from the stopped state to the running state is detected based on the signal from the first rotation speed sensor while the gear position sensor provided at the crankshaft-supporter-integrated transmission supporter detects the neutral position.

7. The straddled vehicle according to claim 1, wherein
the at least one processor of the gear position sensor abnormality detector is arranged or programmed to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and there is one or more gear position between the gear position detected by the gear position sensor and the estimated gear position in terms of an order of gear ratios, and
not to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and either the gear position detected by the gear position sensor is identical with the estimated gear position or the detected gear position is adjacent to the estimated gear position in terms of the order of gear ratios.

8. The straddled vehicle according to claim 1, wherein
the low-speed gear position class includes at least two of the gear positions, and
the at least one processor of the gear position sensor abnormality detector is arranged or programmed to determine that there is an abnormality in the gear position sensor provided at the crankshaft-supporter-integrated transmission supporter when the gear position detected by the gear position sensor provided at the crankshaft-supporter-integrated transmission supporter is included in the low-speed gear position class and a gear ratio of the estimated gear position is lower than a highest gear ratio among the gear ratios of the gear positions in the high-speed gear position class, and
not to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and the gear ratio of the estimated gear position is identical with or higher than the highest gear ratio among the gear ratios of the gear positions in the high-speed gear position class.

9. The straddled vehicle according to claim 1, wherein
the transmission includes a clutch which is switchable between a connection state in which power input from the crankshaft is transmitted to the input shaft and a cut-off state in which the power input from the crankshaft is not transmitted to the input shaft,
a clutch sensor is further provided in the straddled vehicle to detect that the clutch is in the cut-off state or a half clutch state in which part of the power input from the crankshaft is transmitted to the input shaft, and
the at least one processor of the gear position sensor abnormality detector is arranged or programmed not to determine that there is an abnormality in the gear position sensor provided at the crankshaft-supporter-integrated transmission supporter, when the gear position detected by the gear position sensor provided at the crankshaft-supporter-integrated transmission supporter is included in the low-speed gear position class and is different from the estimated gear position, but the clutch sensor detects either the cut-off state or the half clutch state of the clutch.

10. The straddled vehicle according to claim 1, wherein
the at least one processor of the gear position sensor abnormality detector is arranged or programmed to determine that there is an abnormality in the gear position sensor provided at the crankshaft-supporter-integrated transmission supporter, when a duration of a state in which the gear position detected by the gear position sensor provided at the crankshaft-supporter-integrated transmission supporter is included in the low-speed gear position class and is different from the estimated gear position is measured and the measured duration is equal to or longer than a predetermined duration.

* * * * *